(12) United States Patent
Inturi et al.

(10) Patent No.: US 8,214,353 B2
(45) Date of Patent: Jul. 3, 2012

(54) SUPPORT FOR SCHEMA EVOLUTION IN A MULTI-NODE PEER-TO-PEER REPLICATION ENVIRONMENT

(75) Inventors: Nagaraju Inturi, Overland Park, KS (US); Clarence Madison Pruet, III, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 11/060,986

(22) Filed: Feb. 18, 2005

(65) Prior Publication Data

US 2006/0190497 A1  Aug. 24, 2006

(51) Int. Cl.
*G06F 7/00* (2006.01)
*G06F 17/09* (2006.01)

(52) U.S. Cl. .......................................... 707/715; 704/9
(58) Field of Classification Search ............... 707/615; 704/9
See application file for complete search history.

(56) References Cited

U.S. PATENT DOCUMENTS

| | | | |
|---|---|---|---|
| 5,170,480 A | 12/1992 | Mohan et al. | |
| 5,381,545 A | 1/1995 | Baker et al. | |
| 5,423,037 A | 6/1995 | Hvasshovd | |
| 5,675,727 A | 10/1997 | Watanabe | |
| 5,684,984 A * | 11/1997 | Jones et al. | 707/10 |
| 5,737,601 A * | 4/1998 | Jain et al. | 707/201 |
| 5,745,753 A | 4/1998 | Mosher, Jr. | |
| 5,781,912 A | 7/1998 | Demers et al. | |
| 5,799,306 A * | 8/1998 | Sun et al. | 707/102 |
| 5,806,075 A | 9/1998 | Jain et al. | |
| 5,884,327 A | 3/1999 | Cotner et al. | |
| 5,884,328 A | 3/1999 | Mosher, Jr. | |
| 5,926,819 A | 7/1999 | Doo et al. | |
| 5,937,415 A | 8/1999 | Sheffield et al. | |
| 6,058,401 A * | 5/2000 | Stamos et al. | 707/201 |
| 6,061,769 A | 5/2000 | Kapulka et al. | |
| 6,119,130 A | 9/2000 | Nguyen et al. | |
| 6,122,630 A | 9/2000 | Strickler et al. | |

(Continued)

FOREIGN PATENT DOCUMENTS

JP 07210435 8/1995

(Continued)

OTHER PUBLICATIONS

"Informix Guide to SQL Syntax, Chapter 1: SQL Statements, Alter Table," [online] copyright 1998, Informix Software, Inc., [Retrieved on Jan. 17, 2005]. Retrieved from the Internet: <URL: http://www-306.ibm.com/software/data/informix/pubs/library/datablade/dbdk/sqls/01alter.fm1.html>. 22 pages.

(Continued)

*Primary Examiner* — Apu Mofiz
*Assistant Examiner* — Mohammad N Rahman
(74) *Attorney, Agent, or Firm* — Patterson & Sheridan, LLP

(57) ABSTRACT

A method to replicate data is provided. A first replicate comprises a plurality of participants. The first replicate replicates one or more columns of a table. Replication data is transformed between a first local dictionary format and a first common dictionary format at a first participant of the plurality of participants. The replication data is transported in the first common dictionary format among the plurality of participants of the first replicate. The replication data is applied to a table on at least one other participant.

27 Claims, 23 Drawing Sheets

U.S. PATENT DOCUMENTS

| | | | |
|---|---|---|---|
| 6,216,136 B1 | 4/2001 | Ronström | |
| 6,216,137 B1 | 4/2001 | Nguyen et al. | |
| 6,351,795 B1 | 2/2002 | Hagersten | |
| 6,363,387 B1 | 3/2002 | Ponnekanti et al. | |
| 6,377,959 B1 | 4/2002 | Carlson | |
| 6,408,163 B1 | 6/2002 | Fik | |
| 6,421,686 B1 | 7/2002 | Martin, Jr. | |
| 6,460,052 B1 | 10/2002 | Thomas et al. | |
| 6,507,880 B1 | 1/2003 | Arimilli et al. | |
| 6,510,421 B1 | 1/2003 | Ganesh et al. | |
| 6,529,917 B1 | 3/2003 | Zoltan | |
| 6,529,932 B1 | 3/2003 | Dadiomov et al. | |
| 6,532,479 B2 | 3/2003 | Souder et al. | |
| 6,553,442 B1 | 4/2003 | Arimilli et al. | |
| 6,584,477 B1 | 6/2003 | Mosher, Jr. | |
| 6,587,856 B1 | 7/2003 | Srinivasan et al. | |
| 6,615,223 B1 * | 9/2003 | Shih et al. | 707/201 |
| 6,668,260 B2 * | 12/2003 | Zoltan | 707/201 |
| 6,681,226 B2 | 1/2004 | Bretl et al. | |
| 6,721,765 B2 | 4/2004 | Ghosh et al. | |
| 6,732,122 B2 | 5/2004 | Zoltan | |
| 6,738,971 B2 | 5/2004 | Chandrasekaran et al. | |
| 6,748,374 B1 | 6/2004 | Madan et al. | |
| 6,877,016 B1 | 4/2005 | Hart et al. | |
| 6,915,287 B1 | 7/2005 | Felsted et al. | |
| 6,983,277 B2 | 1/2006 | Yamaguchi et al. | |
| 7,003,531 B2 | 2/2006 | Holenstein et al. | |
| 7,162,689 B2 * | 1/2007 | Demers et al. | 715/511 |
| 7,200,620 B2 | 4/2007 | Gupta | |
| 7,200,624 B2 | 4/2007 | He et al. | |
| 7,376,675 B2 | 5/2008 | Pruet, III | |
| 2001/0007103 A1 | 7/2001 | Breiter et al. | |
| 2002/0007363 A1 | 1/2002 | Vaitzblit | |
| 2002/0016793 A1 | 2/2002 | Keith, Jr. | |
| 2002/0065999 A1 | 5/2002 | Kikuchi et al. | |
| 2002/0078231 A1 | 6/2002 | Chang et al. | |
| 2002/0087586 A1 | 7/2002 | Yamagishi | |
| 2002/0091716 A1 | 7/2002 | Yokouchi | |
| 2002/0099726 A1 | 7/2002 | Crudele et al. | |
| 2002/0099728 A1 | 7/2002 | Lees et al. | |
| 2002/0169788 A1 | 11/2002 | Lee et al. | |
| 2002/0174142 A1 | 11/2002 | Demers et al. | |
| 2002/0198899 A1 | 12/2002 | Yamaguchi et al. | |
| 2003/0046342 A1 | 3/2003 | Felt et al. | |
| 2003/0149709 A1 | 8/2003 | Banks | |
| 2003/0154238 A1 | 8/2003 | Murphy et al. | |
| 2003/0158868 A1 | 8/2003 | Zoltan | |
| 2003/0182308 A1 | 9/2003 | Ernst et al. | |
| 2003/0208511 A1 | 11/2003 | Earl et al. | |
| 2003/0212789 A1 | 11/2003 | Hamel et al. | |
| 2003/0225760 A1 | 12/2003 | Ruuth et al. | |
| 2003/0236786 A1 | 12/2003 | Shi et al. | |
| 2004/0006563 A1 | 1/2004 | Zwiegincew et al. | |
| 2004/0025079 A1 | 2/2004 | Srinivasan et al. | |
| 2004/0030703 A1 | 2/2004 | Bourbonnais et al. | |
| 2004/0078379 A1 | 4/2004 | Hinshaw et al. | |
| 2004/0103342 A1 | 5/2004 | Moser et al. | |
| 2004/0133591 A1 | 7/2004 | Holenstein et al. | |
| 2004/0158588 A1 | 8/2004 | Pruet, III | |
| 2004/0205066 A1 | 10/2004 | Bhattacharjee et al. | |
| 2005/0021567 A1 * | 1/2005 | Holenstein et al. | 707/200 |
| 2005/0125423 A1 | 6/2005 | Chou et al. | |
| 2005/0165818 A1 | 7/2005 | Cole et al. | |
| 2005/0193024 A1 | 9/2005 | Beyer et al. | |
| 2005/0193035 A1 | 9/2005 | Byrne | |
| 2005/0193040 A1 | 9/2005 | Adiba et al. | |
| 2005/0193041 A1 * | 9/2005 | Bourbonnais et al. | 707/204 |
| 2005/0278394 A1 | 12/2005 | Oks et al. | |
| 2006/0031811 A1 | 2/2006 | Ernst et al. | |
| 2006/0047713 A1 | 3/2006 | Gornshtein et al. | |
| 2006/0190498 A1 | 8/2006 | Pruet, III | |
| 2006/0190503 A1 | 8/2006 | Naicken et al. | |
| 2007/0226218 A1 | 9/2007 | Chatterjee et al. | |
| 2008/0059469 A1 | 3/2008 | Pruet | |
| 2008/0215586 A1 | 9/2008 | Pruet | |

FOREIGN PATENT DOCUMENTS

| | | |
|---|---|---|
| WO | 03044697 A1 | 5/2003 |

OTHER PUBLICATIONS

Al-Karmi et al., IBM Technical Disclosure Bulletin, "Type Modification in Object Oriented database Using Exception Handling," IBMTDBS#AAA93A063495, v36n12 12-93, pp. 579-580. [online] Dec. 1993 [Retrieved on Aug. 30, 2004] Retrieved from the Internet: <URL: https://www.delphion.com/tdbs/tdb?order=93A+63495>. 2 pages.

Teresa K. Ge, Wayne W. Lee, Brenda M. Lam, United States Patent Application titled "Differential Management of Database Schema Changes," Filed Dec. 17, 2004, Assigned to International Business Machines Corporation, 23 pages.

IBM Informix Dynamic Server Enterprise Replication Guide, Version 9.4, Mar. 2003, Part No. CT1T2NA, pp. i-ix, pp. 1 to 9-22.

IBM Informix Dynamic Server Enterprise Replication Guide, Version 9.4, Mar. 2003, Part No. CT1T2NA, pp. i-ii, pp. Appendix A-1 to G-4, Index pp. 1-18.

Cuenca-Acuna et al., "Autonomous Replication for High Availability in Unstructured P2P Systems", Proceedings of the 22nd International Symposium on Reliable Distributed Systems (SRDS'03), 2003, 10 pages.

Ghandeharizadeh et al., "Placement of Continuous Media in Wireless Peer-to-Peer Networks," IEEE Transactions on Multimedia, vol. 6, No. 2, Apr. 2004, pp. 335-342.

Joshi et al., "ShadowObjects: A Programming Model for Service Replication in Distributed Object Systems," Journal of Parallel and Distributed Computing, vol. 59, No. 1, Oct. 1999. 16 pages.

"Technique for Replicating Distributed Directory Information", May 1991, IBM Technical Disclosure Bulletin, pp. 113-120, [online] [retrieved on Jun. 4, 2004] Retrieved from the Internet:<URL: https://www.delphion.com/tdbs/tdb?o=91A%2061241>. 6 pages.

Dominic J. Delmolino, "Strategies and Techniques for Using Oracle7 Replication: Part 1", Archives, Oracle Magazine Interactive, Methodology [online], May/Jun. 1995, [retrieved on: Jul. 16, 2004] Retrieved from the Internet: <URL: http://arthemis.na.astro.it/oracle/oramag/archives/55METH.html>. 11 pages.

Fabio A.M. Porto et al. "Persistent Object Synchronization with Active Relational Databases", IEEE/ACM AN-6364906, pp. 53-62; Technology of Object-Oriented Languages and Systems, Aug. 1-5, 1999, Santa Barbara, California, IEEE Computer Society.

T.N. Vijaykumar et al, "Transient-Fault Recovery Using Simultaneous Multithreading," Proceedings of the 29th Annual International Symposium on Computer Architecture (ISCA '02), 1063-6897/02, copyright 2002 IEEE, IEEE Computer Society, 12 pages.

IBM Technical Disclosure Bulletin, "Referential Integrity Implementation Details and Advantages," Mar. 1995, pp. 477-486, [online] [retrieved on: Jun. 4, 2004] Retrieved from the Internet: <URL: https//www.delphion.com/tdbs/tdb?o=95A%2060598>. 6 pages.

Non-Final Office Action of Jun. 22, 2007 for U.S. Appl. No. 11/061,071 <10 pages>.

Notice of Allowance of Jan. 14, 2008 for U.S. Appl. No. 11/061,071 <9 pages>.

Non-Final Office Action of May 16, 2007 for U.S. Appl. No. 11/062,072 <9 pages>.

Final Office Action of Nov. 16, 2007 for U.S. Appl. No. 11/062,072 <13 pages>.

Advisory Action of Feb. 7, 2008 for U.S. Appl. No. 11/062,072 <3 pages>.

Non-Final Office Action of May 23, 2008 for U.S. Appl. No. 11/062,072 <14 pages>.

Final Office Action of Nov. 7, 2008 for U.S. Appl. No. 11/062,072 <21 pages>.

Non-Final Office Action of May 30, 2007 for U.S. Appl. No. 11/060,924 <13 pages>.

Final Office Action of Jan. 10, 2008 for U.S. Appl. No. 11/060,924 <21 pages>.

Advisory Action of Apr. 2, 2008 for U.S. Appl. No. 11/060,924 <3 pages>.

Non-Final Office Action of Jun. 20, 2008 for U.S. Appl. No. 11/060,924 <21 pages>.
Final Office Action of Jan. 5, 2009 for U.S. Appl. No. 11/060,924 <22 pages>.
Non-Final Office Action of Feb. 12, 2009 for U.S. Appl. No. 11/469,257 <17 pages>.
Non-Final Office Action for U.S. Appl. No. 11/061,072 having a notification date of Jun. 23, 2009 <23 pages>.
Non-Final Office Action for U.S. Appl. No. 11/060,924 having a notification date of Aug. 17, 2009 <26 pages>.
Notice of Abandonment for U.S. Appl. No. 11/469,257 having a notification date of Sep. 25, 2009 <2 pages>.
Final Office Action of Feb. 1, 2010 for U.S. Appl. No. 11/061,072 <22 pages>.
Final Office Action of Apr. 14, 2010 for U.S. Appl. No. 11/060,924 <25 pages>.
Non-Final Office Action of Jun. 10, 2010 for U.S. Appl. No. 11/061,072 <22 pages>.
Non-Final Office Action of May 16, 2007 for U.S. Appl. No. 11/061,072 <9 pages>.
Final Office Action of Nov. 16, 2007 for U.S. Appl. No. 11/061,072 <13 pages>.
Advisory Action of Feb. 7, 2008 for U.S. Appl. No. 11/061,072 <3 pages>.
Non-Final Office Action of May 23, 2008 for U.S. Appl. No. 11/061,072 <14 pages>.
Final Office Action of Nov. 7, 2008 for U.S. Appl. No. 11/061,072 <21 pages>.

Joseph Silva et al., "An Algorithm to Compare OO-Conceptual Schemas," 18th IEEE International Conference on Software Maintenance (ICSM'02), Oct. 2002: pp. 351-358.
Rocco De Nicola et al., "A modal logic for mobile agents," Journal of ACM Transactions on Computational Logic (TOCL), Jan. 2004, vol. 5(1): pp. 1-53.
Barbara Staudt Lerner, "A model for compound type changes encountered in schema evolution," Journal of ACM Transactions on Database Systems (TODS), Mar. 2000, vol. 25(1): pp. 83-127.
Baowen Xu et al., "Parallel Genetic Algorithms with Schema Migration," 26th Annual International Computer Software and Applications Conference, Aug. 2002: pp. 879-886.
T. M. Wittenburg et al., "An Adaptive Document Management System for Shared Multimedia Data," IEEE International Conference on Multimedia Computing and Systems, 1994: pp. 245-254.
Office Action History of U.S. Appl. No. 11/061,071 from Jun. 22, 2007 to Apr. 30, 2008.
Office Action History of U.S. Appl. No. 12/102,702 from Nov. 20, 2008 to Mar. 30, 2011.
Office Action History of U.S. Appl. No. 11/061,072 from May 16, 2007 to May 17, 2011.
Office Action History of U.S. Appl. No. 11/060,924 from May 30, 2007 to Jun. 10, 2011.
Office Action History of U.S. Appl. No. 11/469,257 from Feb. 12, 2009 to Sep. 25, 2009.
Office Action History of U.S. Appl. No. 11/016,228 from Mar. 7, 2007 to Oct. 19, 2009.

* cited by examiner

SUPPORT FOR SCHEMA EVOLUTION IN A MULTI-NODE PEER-TO-PEER REPLICATION ENVIRONMENT

CROSS-REFERENCE TO RELATED APPLICATIONS

Co-pending U.S. application Ser. No. 11/061,071 entitled "Simulating Multi-User Activity While Maintaining Original Linear Request Order for Asynchronous Transactional Events," filed concurrently herewith, by Clarence Madison Pruet III, assigned to the assignee of the present invention, is incorporated herein by reference in its entirety.

Co-pending U.S. application Ser. No. 11/061,072 entitled "Replication-Only Triggers," filed concurrently herewith, by Clarence Madison Pruet III, assigned to the assignee of the present invention, is incorporated herein by reference in its entirety.

Co-pending U.S. application Ser. No. 11/060,924 entitled "Online Repair of a Replicated Table," filed concurrently herewith, by Rajesh Govind Naicken, Clarence Madison Pruet III, and Konduru Israel Rajakumar, assigned to the assignee of the present invention, is incorporated herein by reference in its entirety.

BACKGROUND OF THE INVENTION 1.0 Field of the Invention

This invention relates to a database management system; and in particular, this invention relates to support for schema evolution in multi-node peer-to-peer replication environment.

2.0 Description of the Related Art

Database management systems allow large volumes of data to be stored and accessed efficiently and conveniently in a computer system. In a database management system, data is stored in database tables which organize the data into rows and columns. FIG. 1 depicts an exemplary database table 24 which has rows 26 and columns 28. To more quickly access the data in a database table, an index may be generated based on one or more specified columns of the database table. In relational database management systems, specified columns are used to associate tables with each other.

The database management system responds to user commands to store and access the data. The commands are typically Structured Query Language (SQL) statements such as SELECT, INSERT, UPDATE and DELETE, to select, insert, update and delete, respectively, the data in the rows and columns. The SQL statements typically conform to a SQL standard as published by the American National Standards Institute (ANSI) or the International Standards Organization (ISO).

Departments within an enterprise may have their own database management systems, typically at different sites. An enterprise typically wants to share data throughout the enterprise. A technique called replication is used to share data among multiple database management systems.

A replication system manages multiple copies of data at one or more sites, which allows the data to be shared among multiple database management systems. Data may be replicated synchronously or asynchronously. In synchronous data replication, a two-phase commit technique is used. In a two-phase commit, a transaction is applied only if all interconnected distributed sites agree to accept the transaction. Typically all hardware components and networks in the replication system must be available at all times in for synchronous replication.

Asynchronous data replication allows data to be replicated, at least on a limited basis, and thus allows for system and network failures. In one type of asynchronous replication system, referred to as primary-target, all database changes originate at the primary database and are replicated to the target databases. In another type of replication system, referred to as update-anywhere, updates to each database are applied at all other databases of the replication system.

An insert, update or delete to the tables of a database is a transactional event. A transaction comprises one or more transactional events that are treated as a unit. A commit is another type of transactional event which indicates the end of a transaction and causes the database to be changed in accordance with any inserts, updates or deletes associated with the transaction.

In some database management systems, a log writer updates a log as transactional events occur. Each transactional event is associated with an entry in the log.

When a replication system is used, a user typically specifies the types of transactional events which cause data to be replicated. In addition, the user typically specifies the data which will be replicated, such as certain columns or an entire row. In some embodiments, the log writer of the database management system marks certain transactional events for replication in accordance with the specified types of transactional events. The replication system reads the log, retrieves the marked transactional events, and transmits the transactional events to one or more specified target servers. The target server applies the transactional events to the replication table(s) on the target server.

A schema is a data structure that describes the columns of a table. A schema specifies the number of columns in a table and the type of data to be stored in the columns of the table. For example, a schema may specify that column one contains integer data, column two contains character data and column three contains floating point data. The schema is changed in order to change the number of columns and/or type of data stored in the columns of the table.

If the schema for a table needs to be altered or if the fragmentation strategy needs to be changed then replication is typically stopped, the table is altered, and replication is restarted. However, stopping replication may cause the client applications to shut down. Some database management systems operate in a non-stop environment and stopping replication may cause client applications to stop. In addition, when a schema of a table is altered, one participant of a replicate may be using the new schema which has a new format for a row of a replicated table, while other participants of the replicate may be using an older format of the row. Because the row formats are different, replication may stop. Therefore there is a need for technique to allow the schema of a replicated table to be changed without causing the client applications to stop.

SUMMARY OF THE INVENTION

To overcome the limitations in the prior art described above, and to overcome other limitations that will become apparent upon reading and understanding the present specification, various embodiments of a method, system and article of manufacture to replicate data are provided. A first replicate comprises a plurality of participants. The first replicate replicates one or more columns of a table. Replication data is transformed between a first local dictionary format and a first common dictionary format at a first participant of the plurality of participants. The replication data is transported in the first common dictionary format among the plurality of participants of the first replicate. The replication data is applied to a table on at least one other participant.

In this way, the schema of a table can be changed without causing client applications to stop.

BRIEF DESCRIPTION OF THE DRAWINGS

The teachings of the present invention can be readily understood by considering the following description in conjunction with the accompanying drawings, in which.

To facilitate understanding, identical reference numerals have been used, where possible, to designate identical elements that are common to some of the figures.

DETAILED DESCRIPTION

Figure 1:
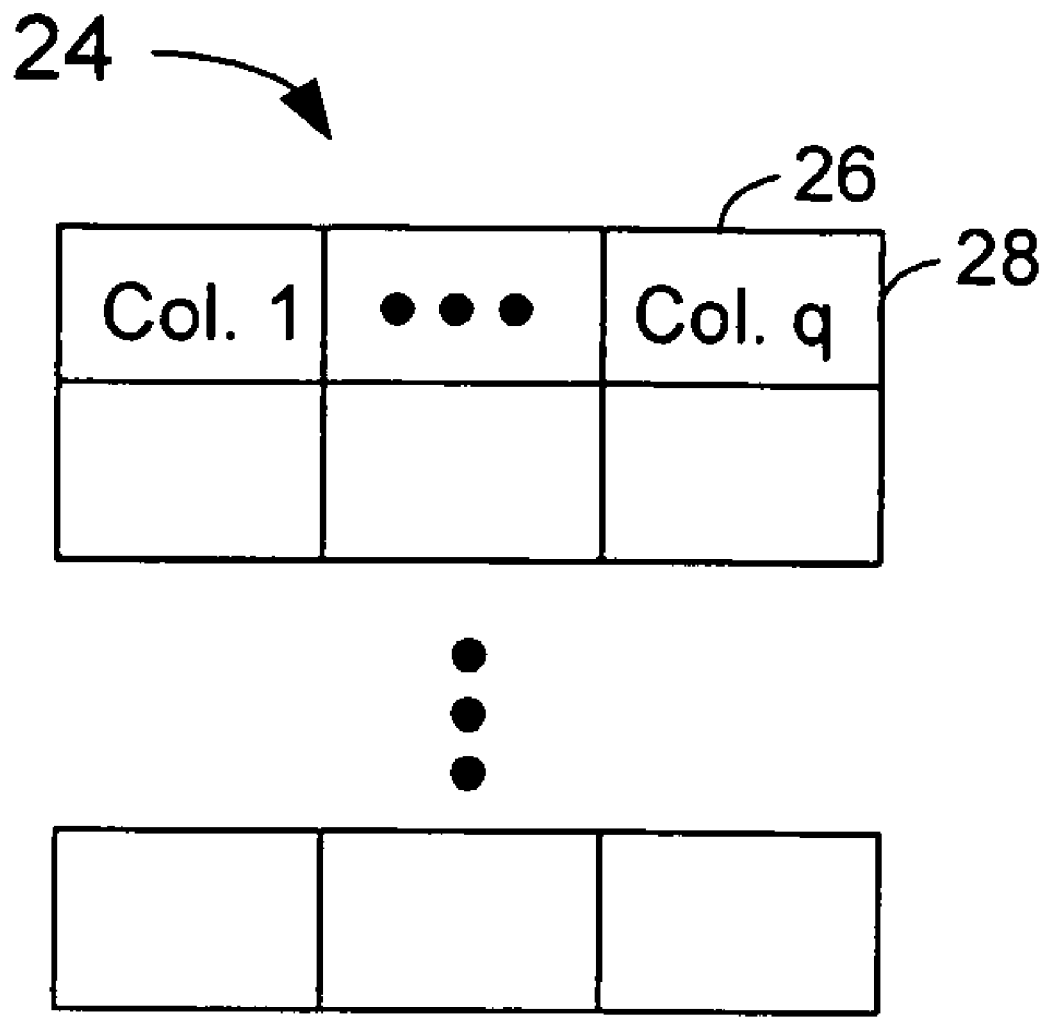
FIG. 1 depicts a block diagram of an illustrative table of a database management system.

After considering the following description, those skilled in the art will clearly realize that the teachings of the various embodiments of the present invention can be utilized to allow the schema of a table to be changed in a multi-node peer-to-peer replication environment without stopping client applications. A method, system and article of manufacture to replicate data are provided. A first replicate comprises a plurality of participants. The first replicate replicates one or more columns of a table. Replication data is transformed between a first local dictionary format and a first common dictionary format at a first participant of the plurality of participants. The replication data is transported in the first common dictionary format among the plurality of participants of the first replicate. The replication data is applied to a table on at least one other participant.

In some embodiments, the replication data is transformed between the first common dictionary format and a second local dictionary format by at least one other participant of the first replicate, and applied to the table on that other participant based on the second local dictionary format. In various embodiments, the first local dictionary format is the same as the second local dictionary format. In other embodiments, the first local dictionary format is different from the second local dictionary format.

A database server is a software application which implements a database management system. A replication server is a database server that participates in data replication. Multiple database servers can execute on the same physical server computer, and each database server can participate in replication. A database or replication server that participates in a replicate may also be referred to as a node.

In replication, changes to one or more tables of a database on a source replication server are collected, transported and applied to one or more corresponding tables on replication target servers. A replication application implements the replication server functionality.

To replicate data, a user defines a replicate, that is, the user provides a replicate definition. A replicate is associated with one or more replication servers, also referred to as participants or nodes, a table to replicate among the participants, and the columns of the table that will be replicated. The replicate is also associated with various attributes which describe how to replicate the data among the participants, such as conflict resolution rules.

The replication server maintains replication information in a replicate definition that comprises one or more tables in the global catalog. The replicate definition comprises information specifying the replicate configuration and environment, data transportation format, information specifying what data is to be replicated, for example, whether to replicate particular columns or an entire row, and information specifying the conditions under which the data should be replicated. The replicate definition also specifies various attributes of the replicate such as a description of how to handle any conflicts during replication. For example, the replication definition comprises a replicate identifier, the name of the replicate, the table(s) of the replicate, the columns to replicate, the SQL select statement which created the replicate, and various flags. The flags comprise a replicate-alter-mode flag, a table-alter-mode flag and a data-conversion flag.

The replication application creates the global catalog when the replication application is initialized. In embodiments which use the IBM Informix Dynamic Server, the global catalog is called the syscdr database.

Each replication server typically has its own local copy of the global catalog and maintains one or more tables in the global catalog to keep track of the replicate definition and state. The global catalog is created when a database server is defined as a replication server. The tables in a global catalog on one replication server are typically automatically replicated to the global catalogs of the other replication servers.

Figure 2:
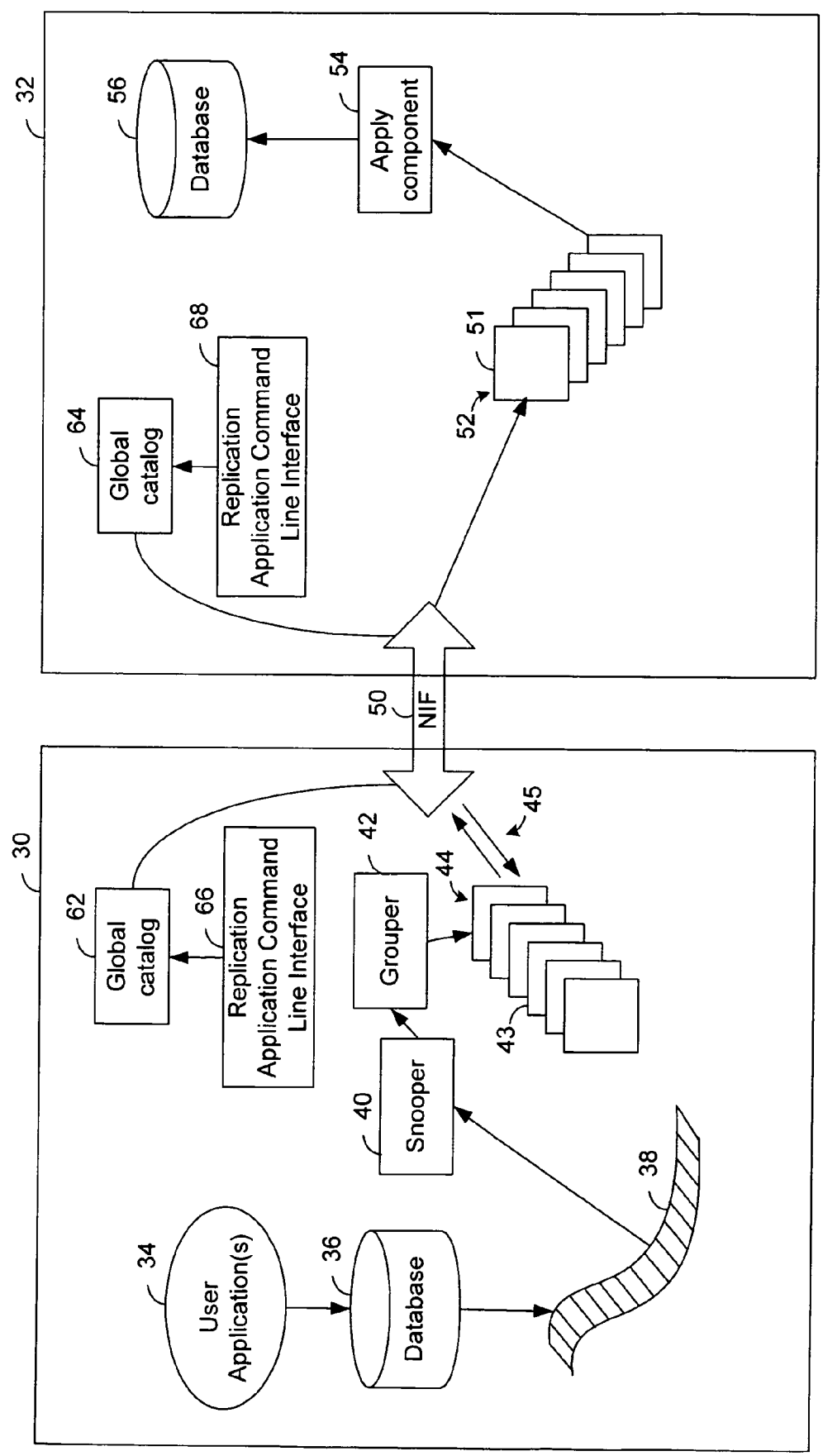
FIG. 2 depicts a diagram of an embodiment of a replication environment suitable for use with the present invention.

FIG. 2 depicts a diagram of an embodiment of a replication environment suitable for use with the present invention. A source replication server 30 and a target replication server 32 are participants in a replicate. The source replication server 30 and the target replication server 32 will be referred to as a source server and a target server. The source server 30 and the target server typically execute on different computer systems. In the source server 30, one or more user applications 34 are accessing and changing the tables of a database 36. The changes to the database 36 are stored in a log 38. The changes to the data are transactional events, and the transactional events are stored in the log. The replication application comprises a snooper 40 and a grouper 42. The snooper 40 reads the log 38 and captures various changes to the database in accordance with the replicate definition. The grouper 42 assembles the captured changes in accordance with their associated transactions to provide transaction replication data 43 and places the transaction replication data 43 in a queue 44 to send to the target server 32 via the network interface (NIF) 50. As indicated by arrows 45, the queue 44 can be used to send and receive data. The queue 44 comprises a send queue to send data to the target server 32, and a receive queue to receive data from the target server 32.

In the target server 32, the transaction replication data 51 is received in a queue 52. An apply component 54 retrieves the transaction replication data 51 from the queue 52 and applies the replication data 51 to the appropriate table and column(s) in the database 56.

The source and target servers, 30 and 32, have global catalogs, 62 and 64, and a replication application command line interface, 66 and 68, respectively. The replication application command line interface 66 and 68 receives commands for the replication application, and executes those commands. The replication application command line interface 66 and 68 is also used to update the global catalogs 62 and 64, respectively.

In various embodiments, the replication application on a replication server typically comprises a snooper, a grouper and an apply component. In this way, data can be replicated both to and from the replication server.

In some embodiments, a computer system executing the replication application comprises multiple central processing units or processors, and various portions of the replication operation are executed concurrently. For example, the apply component may execute on one or more processors and each portion of the apply component that executes on one processor is referred to as an apply thread.

A table of a database has one or more columns. A schema contains a definition of the table such as the name of the columns, the number of columns, the position of the columns in the table and the type of data stored in the columns. In other words, the schema specifies the format of the table. The schema may also be referred to as a local dictionary of the table. The term, replication table, refers to a table that is replicated. In a multi-node peer-to-peer replication environment, the schema for a replication table may be changed on one node while the schema on the other nodes remains unchanged. In database management systems which use replication, when the schema of a replication table is changed, it is desirable that the replication application dynamically detect the schema change and adjust its internal structures in accordance with the new format specified by the changed schema. It is also desirable that client applications be able to change the underlying replication table's schema without having any knowledge of the replication application.

A row image refers to row data of a particular table version, that is, a particular schema. After each "alter" operation, a table version is incremented by one. It is desirable that the replication application understand any version of the row image. It is also desirable that any version of a row image be converted to the current version of the table.

In various embodiments, the replication application sends and receives data in a common format that both the sender and receiver understand. A local table dictionary contains metadata which describes the storage characteristics of the table, that is, the schema. In other words, the local table dictionary is the schema of the table. In the global database, catalog tables contain internal data such as the replication topology and information describing the underlying replication table (s). In some embodiments, the replication application stores a replication table dictionary in catalog tables. The replication table dictionary provides a common dictionary format that both the sender and receiver recognize for a replicate. Data of a replicate is transported using the common dictionary format. The replication application converts any version of the row image between the local dictionary format and the common dictionary format. The common dictionary format is referred to as a mastered dictionary format. The mastered dictionary format is achieved through a technique referred to as mastered replicates, which will be described in further detail below.

The replication application typically depends on the underlying database server to convert the row data from an older version format to a current version format. In response to receiving a SQL command to alter a table, the database server notifies the replication application before altering the replication table, that is, changing the schema, which is referred to as pre-alter event notification. The database server also notifies the replication application after performing altering the table, that is, changing the schema, which is referred to as post-alter event notification. In response to pre-alter event notification, the replication application prepares for the schema change to the underlying replication table. For example, a shadow table is a mirror image of the replication table which is used to store deleted rows from the replication table. A conflict resolution component of the replication application utilizes the shadow table to resolve conflicts while applying replicated data to the replication table. In response to a post-alter event notification event, the replication application changes its internal structures, such as data structures and the schema of the shadow table, in accordance with the new table schema format.

In some embodiments, an "alter mode set" operation provides pre-alter event notification and an "alter mode unset" operation provides the post-alter event notification.

In various embodiments, a user issues a SQL alter statement to alter a table. As part of performing the SQL alter statement, the database server issues the alter mode set and alter mode unset operations.

In other embodiments, a user explicitly issues an alter mode set request, alters one or more tables, and then issues an alter mode unset request. The alter mode set request causes the alter mode set operation to be performed. The alter mode unset request causes the alter mode unset operation to be performed. In some embodiments, a user issues the alter mode set and unset requests when attaching a fragment to a table. To attach a fragment to a table, a user issues an alter mode set command, drops the primary key, attaches the fragment, recreates the primary key and issues an alter mode unset command.

The term "replication domain" refers to the participants or nodes of a replicate. When a table of a replicate is altered, it is sometimes desirable to seamlessly switch the replicate definitions. It is difficult to alter a table on all nodes within the replication domain and ensure that there are no pending transactions queued when the alter occurs. This is especially a problem when the replicates are "update anywhere" because the table which was altered may be receiving data in the older format.

For example, consider a bi-directional replication in which a table, called Tab1, is replicated between database server-A and database server-B. At any point in time, changes for Tab1 may exist in a send queue on database server-A and additional changes for Tab1 may exist in a send queue on database server-B. In some replication applications, Tab1 is altered at a point of singularity in which all queues are emptied of pending changes and the alter is issued on all participants of the replicate at the same point.

In various embodiments, a staging approach is used to alter a replication table on the participants of a replicate, rather than using a point of singularity. In the staging approach, multiple replicates which are associated with each other are used. Using the staging approach, a single apply component or thread can support data arriving from multiple sources. The apply component or thread at the target server considers the different associated replicates to be equivalent, but the snooper at the source server uses a specific version of the table. By using this approach, the changes to the table's schema can be staged.

Figure 3:
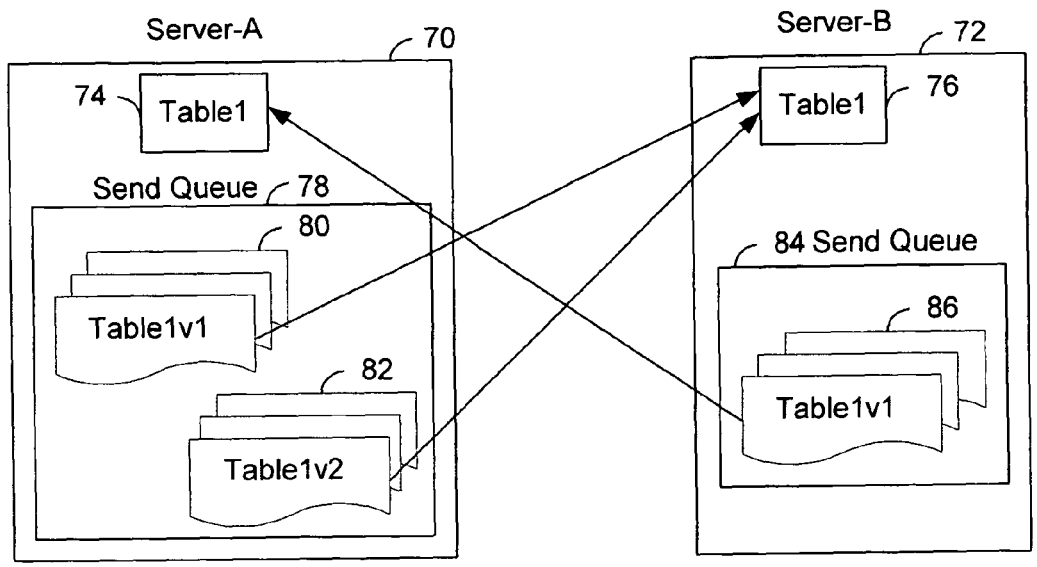
FIG. 3 depicts a block diagram of two exemplary replication servers.

FIG. 3 depicts a block diagram of two exemplary replication servers, Server-A 70 and Server-B 72. Server-A 70 has a table named Table1 74 and Server-B also has a table named Table1 76. A first replicate comprising Server-A 70 and Server-B 72 for Table1 uses a first version of Table1, Table1v1 80. On Server-A 70, the schema for Table1 74 has been changed. A second replicate comprises Server-A 70 and Server-B 72 uses a second version of Table1, Table1v2 82. The second replicate is associated with the first replicate. In the send queue 78, data for the two replicates of Table1, called Table1v1 80 and Table2v2 82, is being sent to Server-B 72. In the send queue 84 on Server-B 72, data is being sent for a single version of Table1, Table1v1 86, to Server-A 70.

The apply component or thread on Server-B 72 considers the first and second replicates to be equivalent. The apply component or thread treats the replicated data from the first and second replicates as though the replicated data were received from a single replicate. In some embodiments, a technique called versioned replicates is used to associate the first and second replicates with each other. In another embodiment, a technique called shadow replicates is used to associate the first and second replicates with each other. Various embodiments of the invention will be described with reference to shadow replicates. However, the invention is not meant to be limited to shadow replicates and versioned replicates, and other techniques may be used.

A shadow replicate is a replicate which is defined to be used in conjunction with another replicate which is referred to as a primary replicate. The shadow replicate can have some differences from the primary replicate. For instance, the shadow replicate may include different columns from the primary replicate, or may involve a subset of less than all of the servers or nodes used by the primary replicate. In addition, the shadow replicate may have different conflict resolution rules from the primary replicate. The source replication server will typically transmit replicated data using the primary replicate. The apply component or thread on the replication target server considers the shadow and primary replicates as equivalent. By having the apply component or thread consider the first and second replicates as equivalent, the shadow replicate is used to maintain proper ordering, and the rules for parallelism can be common for the two replicates. The rules for parallelism refer to the rules for processing replicated data concurrently, that is, in parallel. This helps to maintain proper ordering for any common row within the two replicates. Co-pending U.S. application Ser. No. 11/061,071 entitled "Simulating Multi-User Activity While Maintaining Original Linear Request Order for Asynchronous Transactional Events," filed concurrently herewith, by Clarence Madison Pruet III, describes various embodiments of processing replicated data concurrently.

In addition, a primary replicate may be associated with more than one shadow replicate. Shadow replicates are described in further detail in U.S. application Ser. No. 11/060,924 entitled "Online Repair of a Replicated Table," filed concurrently herewith, by Rajesh Govind Naicken, Clarence Madison Pruet III, and Konduru Israel Rajakumar.

In various embodiments, the replication application sustains schema changes to the underlying replication table(s) without any interruption to the replication traffic and client applications. In some embodiments, the following techniques are used to support schema evolution during replication: mastered replicates, alter mode set and unset operations, shadow replicates and a remastering process.

A mastered replicate is a replicate which contains additional dictionary information that describes the replicate table definition and the data transportation format. In various embodiments, a replicate, including a mastered replicate, is defined by using a query statement against the table being replicated, much like a conventional SQL select statement. The query statement specifies one or more columns of a table to replicate. When defining a mastered replicate, by referencing a node or replication server which has a description of the specified columns of the query which is used to define the replicate, dictionary information which is used to describe the replicate transport format is obtained. This dictionary information is stored in one or more tables in the global catalog to provide a mastered dictionary. The mastered dictionary is used as the common transport format for the replicate, which is referred to as a mastered replicate.

As nodes are added to the mastered replicate, the description of the replicated columns of a table in a local dictionary on the node is compared to the corresponding description in columns in the mastered dictionary. If the description of any column of the local dictionary is not compatible, or alternately, does not match, with the description of the corresponding column in the mastered dictionary, the addition of the node to the replicate is rejected.

In various embodiments, the description of the columns in the mastered dictionary of the mastered replicate is also compared with the description of the corresponding columns in the local table dictionary as replication is started on each node of the replicate. If the description in the mastered dictionary matches, or is compatible with, the description in the local table dictionary, replicated data is moved to and from the queue without any conversion to and from the mastered dictionary format, respectively. If the description of any column in the mastered dictionary does not match, or is not compatible with, the description of the corresponding column in the local table dictionary, column conversion will be performed as data is moved to and from the queue.

Remastering is a process in which a new mastered primary replicate is created based on the existing mastered primary replicate and the new schema definition. The new mastered replicate uses the new schema definition of the table. After remastering, the original mastered primary replicate becomes a mastered shadow replicate of the new mastered primary replicate. The new mastered primary replicate propagates replicated data in the new mastered dictionary format which is based on the new schema.

The user typically alters the schema of the replicated table on the other nodes which participate in the replicate, and remasters the replicate after altering the schema of the table at all the replication participants. The remastering process will be described in further detail below in the description of mastered replicates.

In various embodiments, to create a new replicate definition, the definition in the schema or dictionary of the columns of the replicate matches at all the participants of the replicate, otherwise the creation of the new replicate definition will fail. The definition of a column is determined to match if it has the same data type at all the participants. In various embodiments, the definition of a column is determined to match if it has a compatible data type at all the participants. In another embodiment, in response to a name verification replicate attribute being set, the definition of a column is determined to match if the column name is the same at all participants in addition to the data type being compatible.

In some embodiments, certain data types are considered to be equivalent and are therefore compatible. In various embodiments, within a database server and the replication application, all large object types (LOBS) are considered to be equivalent. There are additional data types which are considered to be equivalent if they represent distinct variables of the same fundamental data type. In some embodiments, if a serial column on one node is fundamentally an integer type, that serial column can successfully replicate to an integer column on a target node. In other embodiments, a column having a data type of money can successfully replicate to a column having a data type of decimal.

For example, after an alter which adds a column to a replicated table is performed at all the replicate participants, the user can "remaster the replicate" to add the new column to the replicate definition. As part of the remastering process, a shadow replicate is created which comprises the new column. The shadow replicate is swapped with the original replicate. Since the apply component treats the primary and shadow replicates as equivalent, the apply component can process data from either replicate while sending data in the new replicate. If remastering is not performed, data for the newly added column will be discarded at the source server itself while converting data from the local table dictionary format to the mastered dictionary format for transportation.

In various embodiments, the alter mode set operation provides pre-alter event notification to the replication application, and the alter mode unset operation provides the post-alter notification to the replication application. Alter mode is a state of a replicated table. The alter mode state may be indicated by a flag which is associated with the table. In response to an alter mode set operation on one or more tables, the replication application sets those tables to alter mode. While in alter mode, typically only data definition language (DDL) and select operations are allowed on a table. Data manipulation language (DML) operations comprise insert, update and delete operations. DML operations are typically disallowed on the table in alter mode, except that internal threads of the replication application can perform DML operations on the table.

Figure 4:
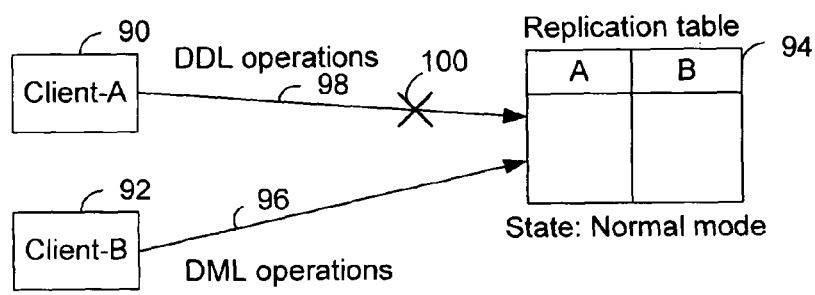
FIG. 4 depicts a diagram illustrating the normal mode state, that is, a non-alter mode state.

FIG. 4 depicts a diagram illustrating the normal mode state, that is, a non-alter mode state. Client applications, Client-A 90 and Client-B 92, are generating transactions which affect a replication table 94. The replication table 94 has two columns named A and B. The client applications, Client-A 90 and Client-B 92, are performing DML operations 96 on the replication table 94. The client applications, Client-A 90 and Client-B 92, cannot perform DDL operations 98 on the replicated table 94 as indicated by the "x" 100.

Figure 5:
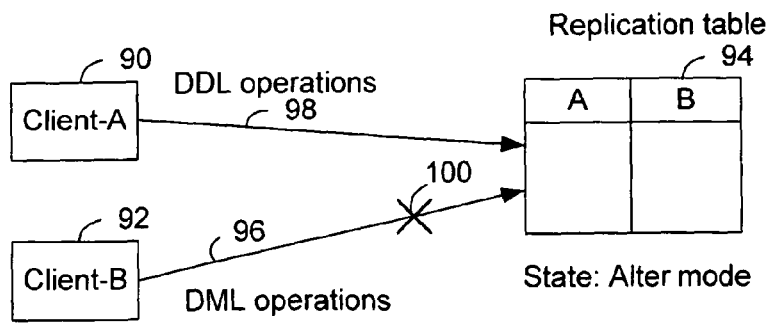
FIG. 5 depicts a diagram illustrating the alter mode state.

FIG. 5 depicts a diagram illustrating the alter mode state. Because the replication table 94 is in the alter mode state. The client applications, Client-A 90 and Client-B 92, are performing DDL operations 98 on the replication table 94. The client applications, Client-A 90 and Client-B 92, cannot perform DML operations 98 on the replication table 94 as indicated by the "x" 102.

Figure 6:
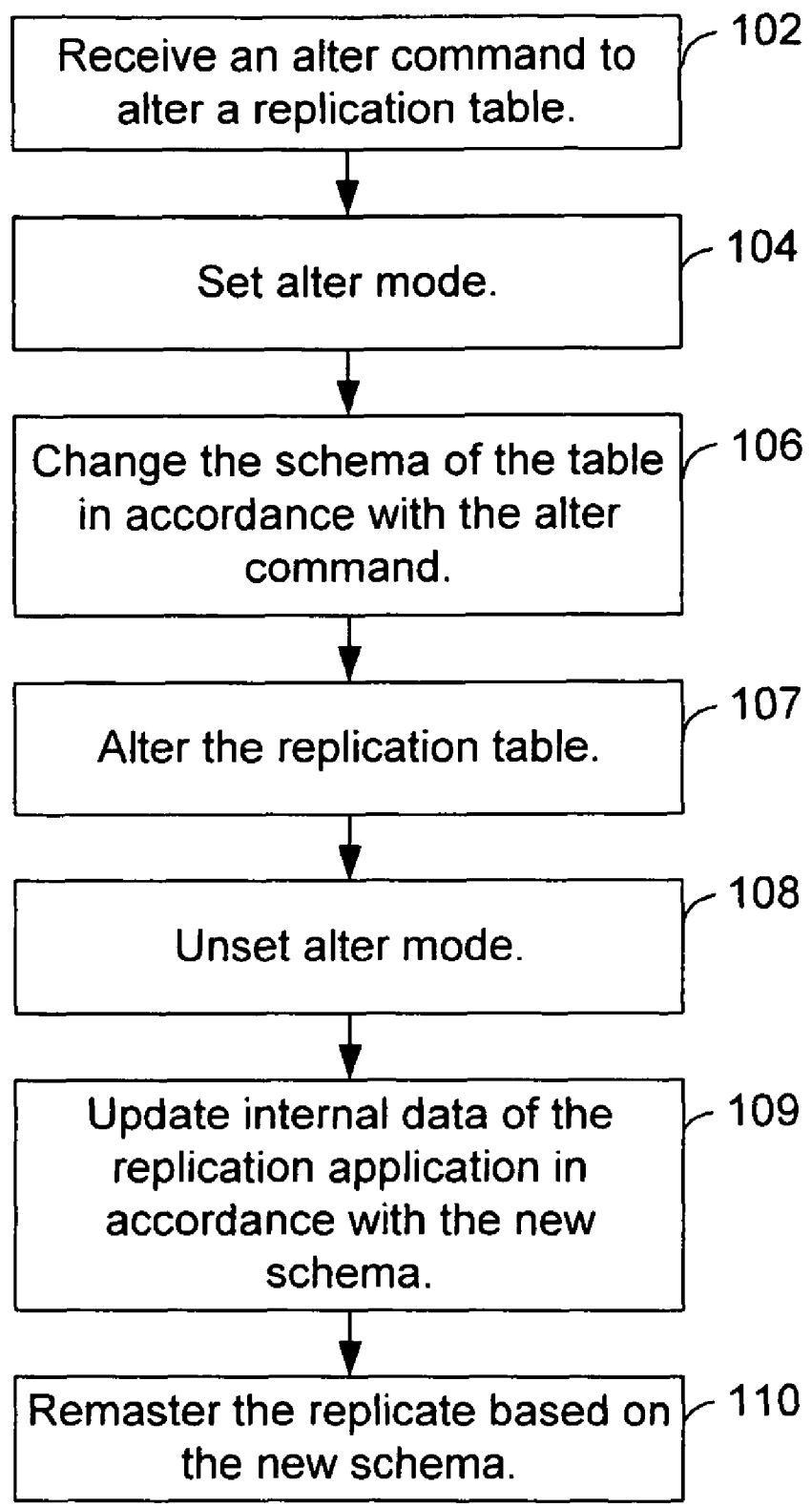
FIG. 6 depicts a high-level flowchart of an embodiment of altering a table.

FIG. 6 depicts a high-level flowchart of an embodiment of altering a table. In step 102, a command to alter a replication table is received. In step 104, alter mode is set. In step 106, the schema of the table is changed in accordance with the alter command. In step 107, the replication table is altered. Typically the database engine alters the replication table. In step 108, alter mode is unset. In step 109, internal data of the replication application is updated in accordance with the new schema. In some embodiments, in step 110, after the table on each node of the replicate has been altered, a user remasters the replicate based on the new schema.

A replay position is the point where replication would have to begin re-snooping the data in the log in case the database server fails. The current log position refers to the database server's log writer's current position in the log. The log writer of the database server writes the next log record at the current position in the log. Replay position advancement to the current log position is not triggered if the alter operation type is an in-place alter or if the local server is a receive-only participant.

Figure 7:
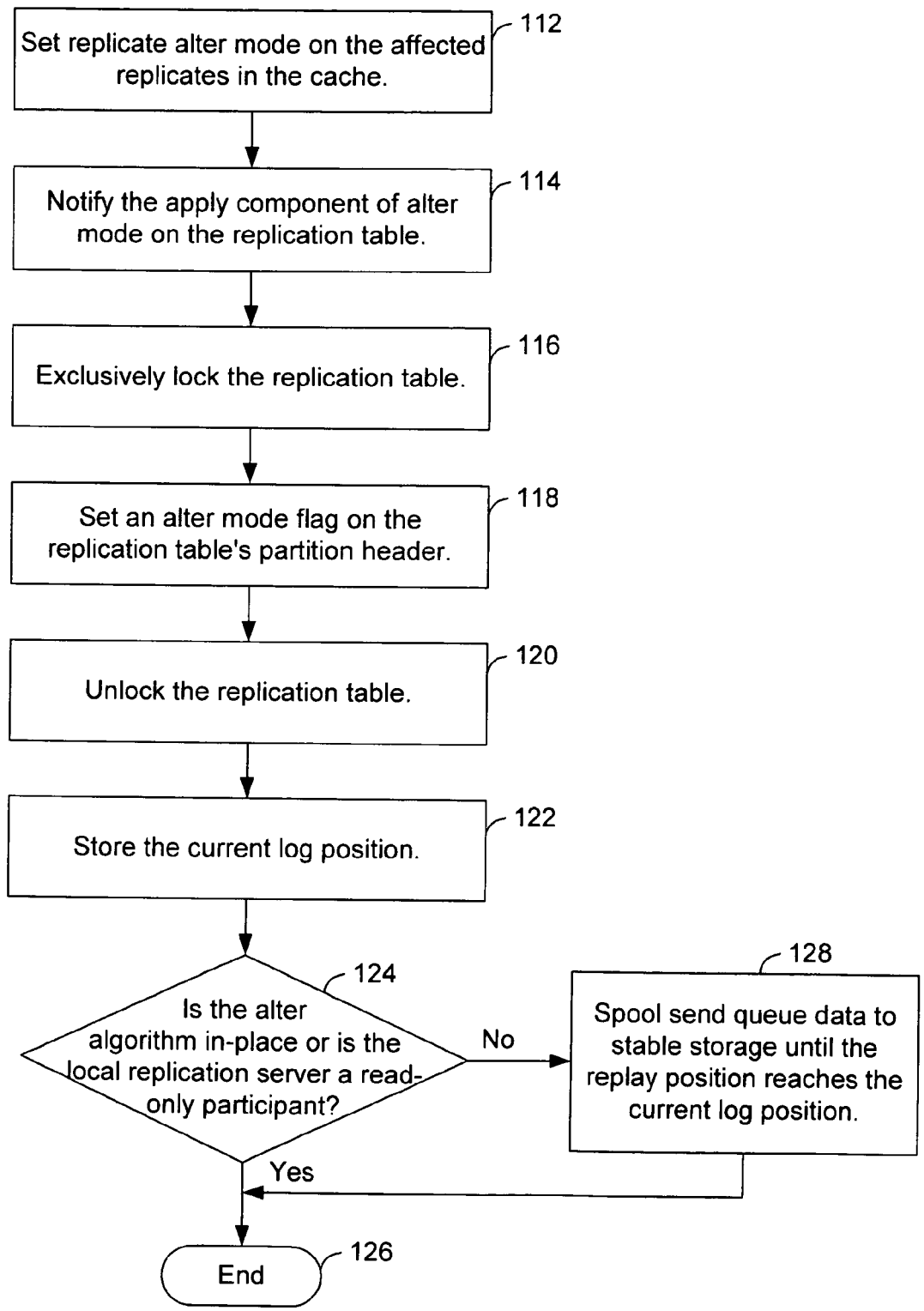
FIG. 7 depicts a flowchart of an embodiment of the processing performed in an alter mode set operation.

FIG. 7 depicts a flowchart of an embodiment of the processing performed in an alter mode set operation. In various embodiments, the flowchart of FIG. 7 is performed by the replication application. In step 112, alter mode is set on the affected replicates. In some embodiments, alter mode is set on the affected replicates by setting a replicate-alter-mode flag for each affected replicate. The affected replicates are those which replicate one or more columns of the replication table being altered. In some embodiments, the affected replicates comprise a primary replicate for the replication table and any associated shadow replicates. In some embodiments, alter mode is set on the affected replicates which are in the cache.

In step 114, the apply component or thread is notified of alter mode on the replication table. In some embodiments, the setting of the replicate-alter-mode flag notifies the apply component or thread.

In step 116, the replication table is exclusively locked. The replication table is exclusively locked to block user threads from accessing the replication table. In step 118, a table-alter-mode flag is set on the replication table's partition header(s). Setting the table-alter-mode flag on the replication table's partition header prevents any other user from opening the replication table. Thus, a point of singularity is provided for the table so that no other user can access the table. In step 120, the replication table is unlocked. In step 122, the current log position is stored. The database server writes the next log record at the current log position.

Step 124 determines whether the alter algorithm is an in-place alter algorithm or if the local replication server is a read-only participant. An in-place alter algorithm allows a table to be altered in-place instead of creating a new table with the new schema and copying rows from the old table to the new table.

If step 124 determines that the alter algorithm is an in-place alter algorithm or if the local replication server is a read-only participant, step 124 proceeds to step 126 and the flowchart ends. If step 124 determines that the alter algorithm is not an in-place alter algorithm and that if the local replication server is a not read-only participant, in step 128, the data in the send queue is spooled to stable storage, such as disk storage, until the replay position reaches the current log position. Step 128 proceeds to step 126.

Figure 8:
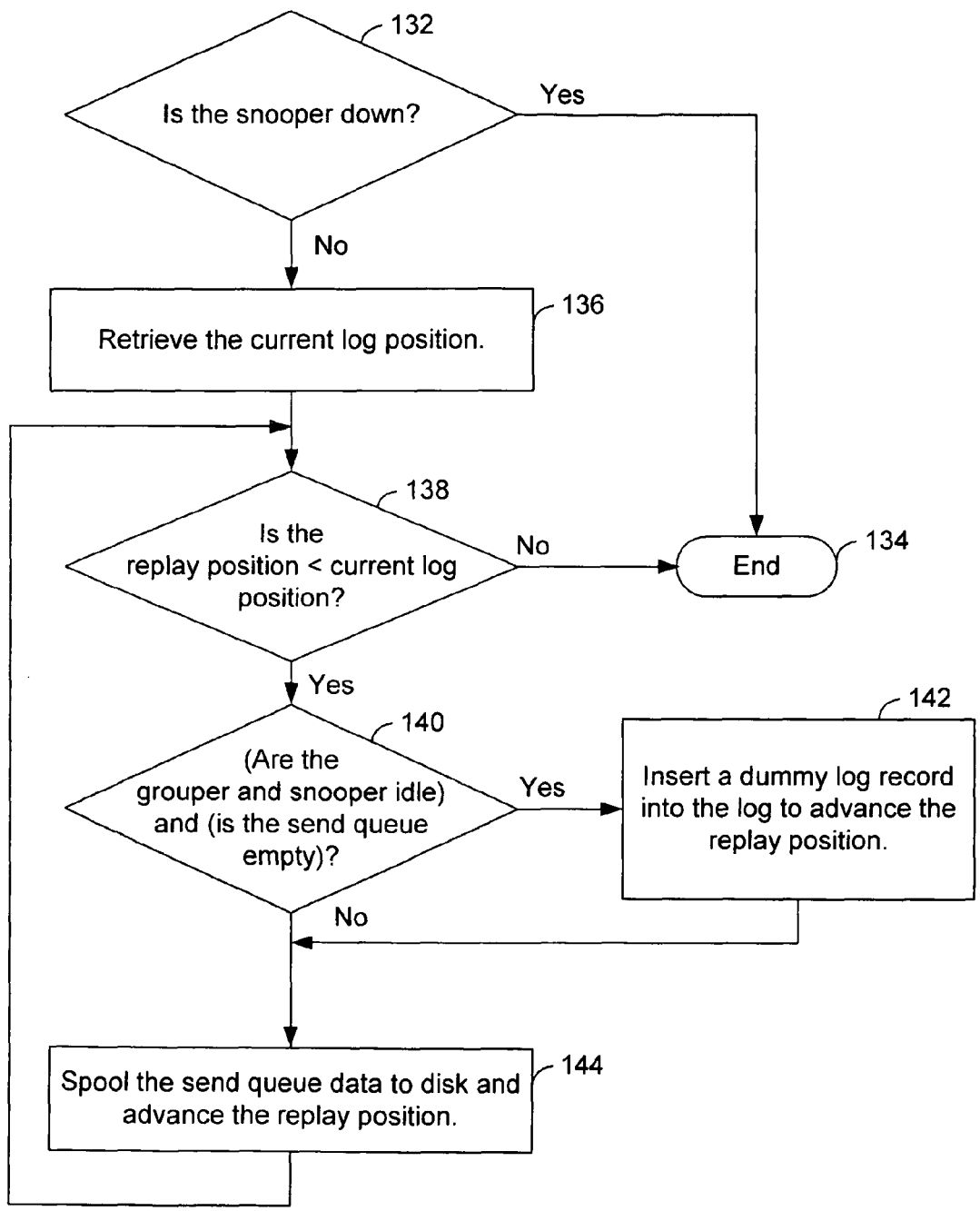
FIG. 8 depicts a flowchart of an embodiment of advancing the replay position.

FIG. 8 depicts a flowchart of an embodiment of advancing the replay position. The flowchart of FIG. 8 implements step 128 of FIG. 7. Step 132 determines whether the snooper is down. For example, the snooper is down when the snooper is not being executed; and the snooper is not down when the snooper is being executed. If step 132 determines that the snooper is down, in step 134, the flowchart ends. If step 132 determines that the snooper is not down, in step 136, the current log position is retrieved. Step 138 determines whether the replay position is less than the current log position. If not, in step 134, the flowchart ends. If step 138 determines that the replay position is less than the current log position, step 140 determines whether the grouper and snooper are idle and whether the send queue is empty. If so, in step 142, a dummy log record is inserted into the log to advance the replay position, and step 142 proceeds to step 444. If step 140 determines that the grouper and snooper are not idle or that the send queue is not empty, in step 144, the data in the send queue data is spooled to the disk and the replay position is advanced. The replay position is advanced in accordance with the log position of the log data in the send queue that was spooled. Step 144 proceeds to step 138.

Figure 9:
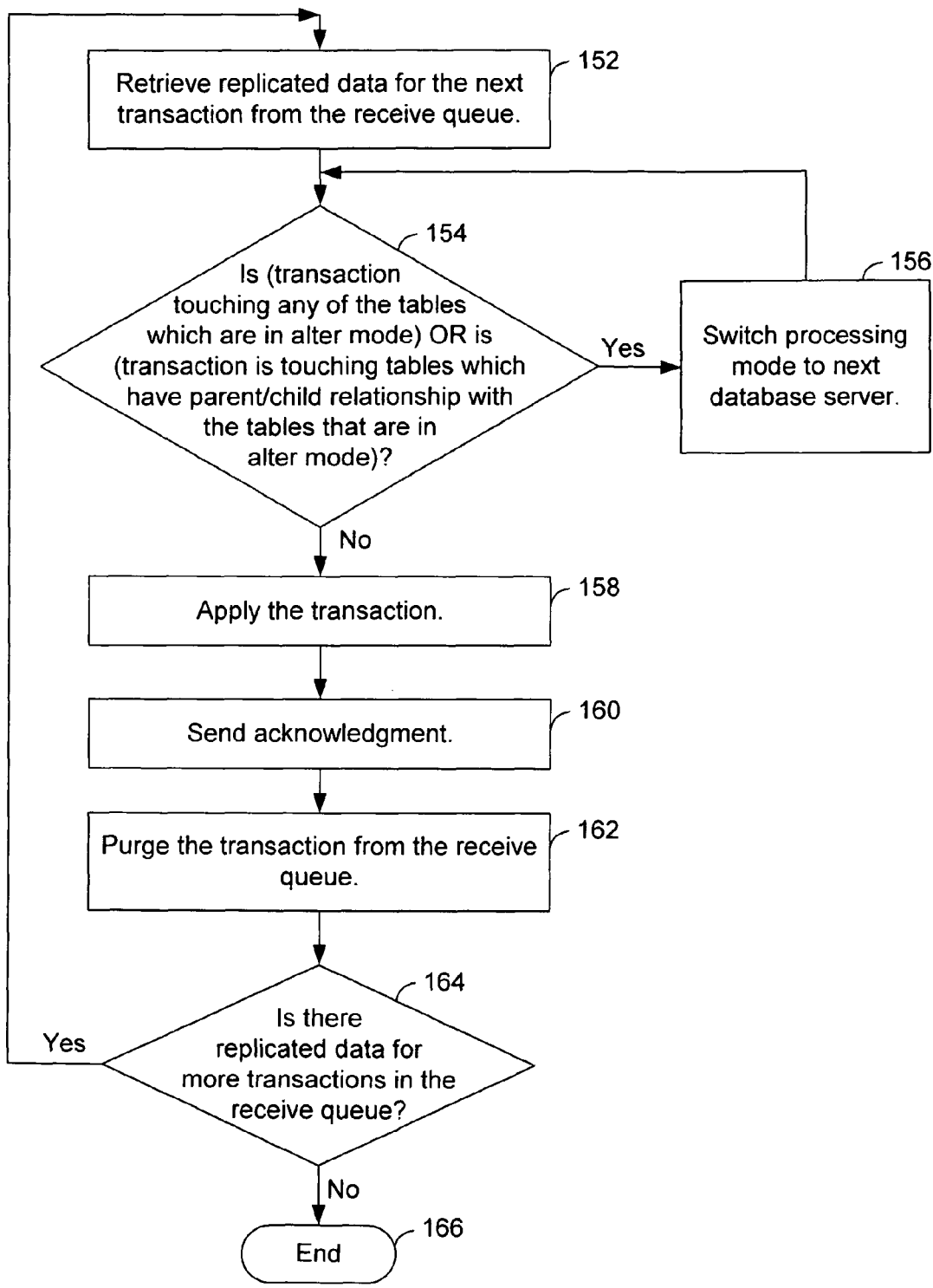
FIG. 9 depicts a flowchart of an embodiment of the processing of the apply component or thread while one or more replication tables are in alter mode.

FIG. 9 depicts a flowchart of an embodiment of the processing of the apply component or thread while one or more replication tables are in alter mode. In step 152, the replicated data for a next transaction is retrieved from the receive queue. Step 154 determines whether the transaction is touching any of the tables which are in alter mode or whether the transaction is touching tables which have a parent/child relationship with the tables that are in alter mode. If so, in step 156, the processing mode is switched to the next database server, and step 156 proceeds to step 154. If step 154 determines that the transaction is not touching any of the tables which are in alter mode and that the transaction is not touching tables which have a parent/child relationship with the tables that are in alter mode, in step 158, the transaction is applied, that is, the replicated transactional events of the transaction are applied.

In step 160, an acknowledgment is sent. The acknowledgment is sent to the source database server of the transaction to indicate that the transaction was applied. In some embodiments, the acknowledgment is a post-commit success trigger. Co-pending U.S. application Ser. No. 11/061,072 entitled "Replication-Only Triggers," filed concurrently herewith, by Clarence Madison Pruet III, describes various embodiments of a post-commit success trigger.

In step 162, the transaction is purged from the receive queue. Step 164 determines whether there are more transactions in the receive queue. If not, the flowchart ends in step 166. If step 164 determines that there are more transactions in the receive queue, step 164 proceeds to step 152.

Figure 10:
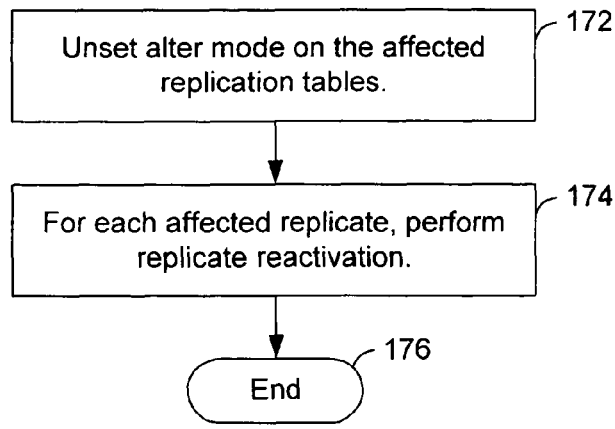
FIG. 10 depicts a flowchart of an embodiment of the processing performed as part of an alter mode unset operation.

FIG. 10 depicts a flowchart of an embodiment of the processing performed as part of the alter mode unset operation.

In some embodiments, the flowchart of FIG. 10 is performed in step 108 of FIG. 6. In step 172, alter mode is unset on the affected replication tables. In various embodiments, the table-alter-mode flag is unset in the affected partition headers of the replicated table(s). In step 174, for each affected replicate, replicate reactivation is performed. In step 176, the flowchart ends.

Figure 11:
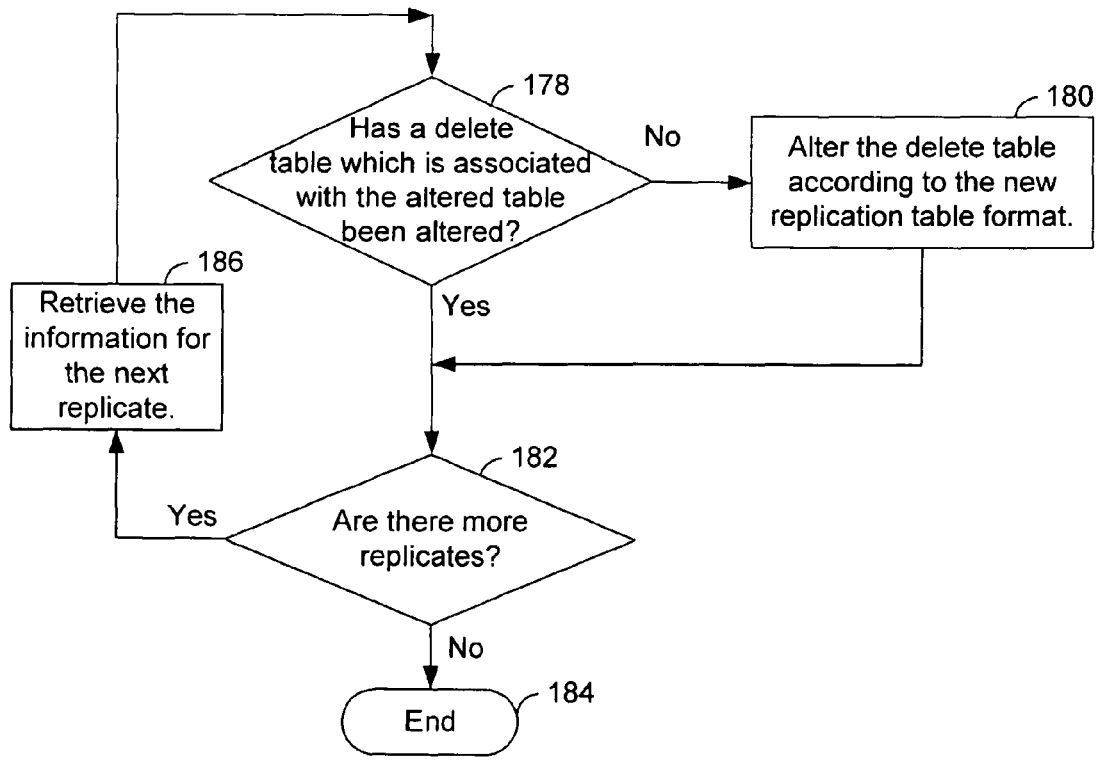
FIG. 11 depicts a flowchart of an embodiment of performing replicate reactivation.

FIG. 11 depicts a flowchart of an embodiment of performing replicate reactivation. A delete table contains the contents of rows that have been deleted from an associated table. Step 178 determines whether a delete table which is associated with an altered table has been altered. If not, in step 180, the delete table is altered according to the new replication table format specified in the schema. Step 180 proceeds to step 182. If step 178 determines that the delete table has been altered, step 178 proceeds to step 182. In some embodiments, the replicate-alter-mode flag of the replicate is unset as part of replicate reactivation.

Step 182 determines whether there are more replicates. If not, in step 184, the flowchart exits. If step 182 determines that there are more replicates, in step 186, the information for the next replicate is retrieved and step 186 proceeds to step 178.

Figure 12A:
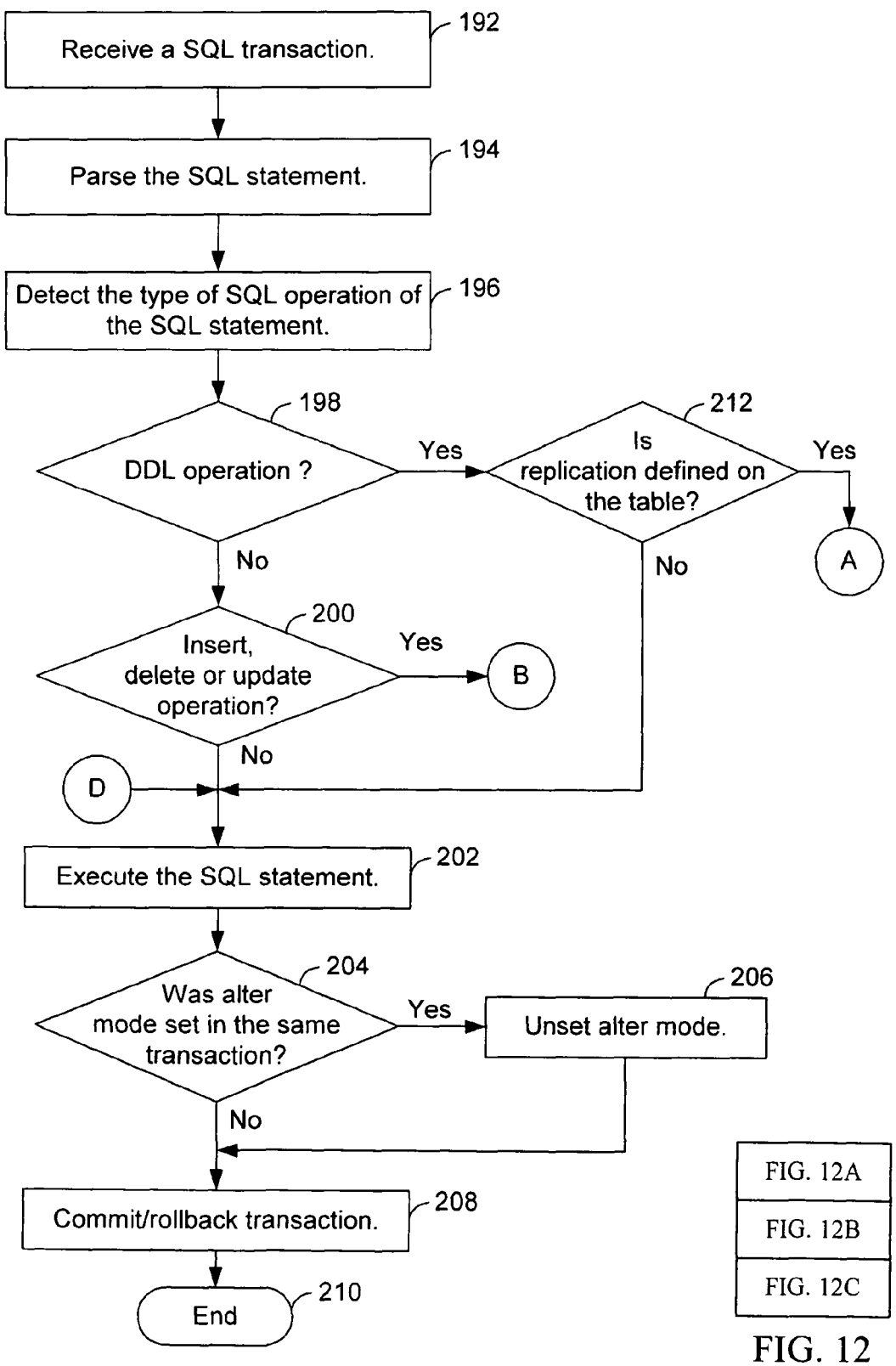
FIG. 12 comprises FIGS. 12A, 12B and 12C which collectively depict a flowchart of an embodiment of the alter mode set and alter mode unset operations in conjunction with a SQL alter statement.
Figure 12B:
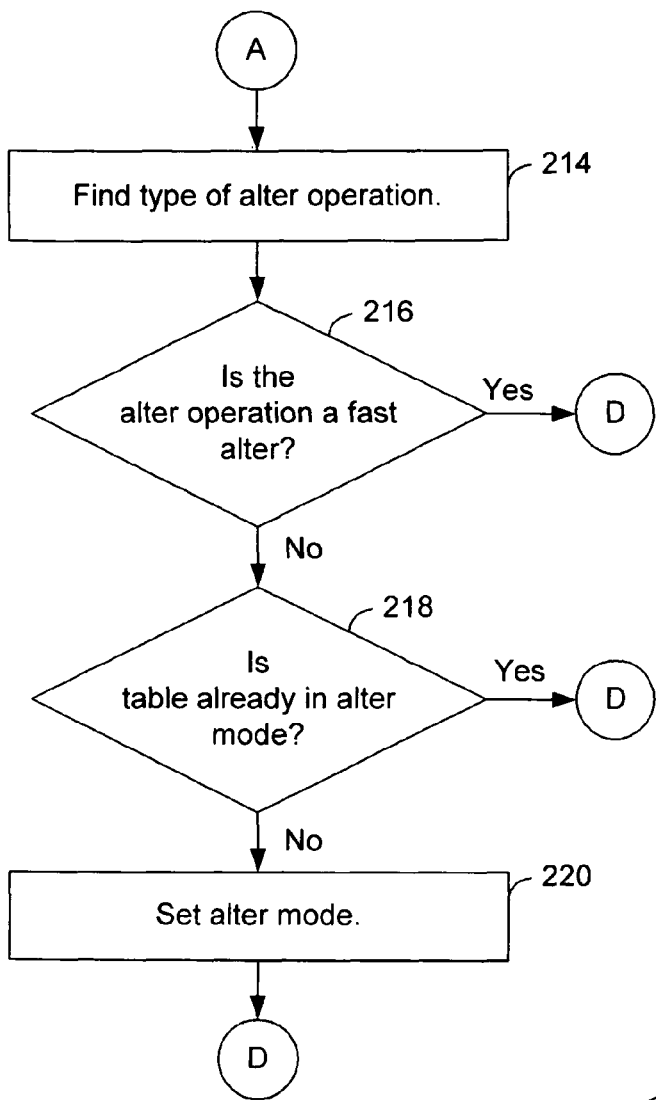
Figure 12C:
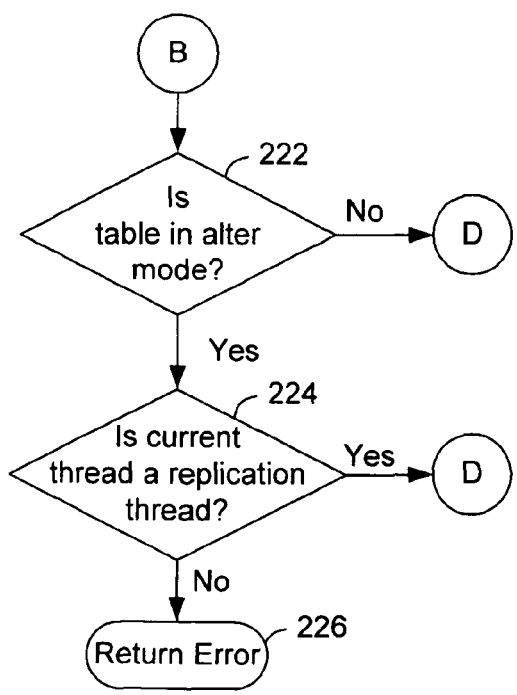

FIG. 12 comprises FIGS. 12A, 12B and 12C which collectively depict a flowchart of an embodiment of the alter mode set and alter mode unset operation in conjunction with a SQL alter statement. In step 192, a SQL transaction is received. In step 194, the SQL statement is parsed. In step 196, the type of SQL operation of the SQL statement is detected. Step 198 determines whether the SQL operation is a DDL operation. For example, a DDL operation may be an alter table or alter fragment operation, or a clustered index creation. If not, step 200 determines whether the SQL operation is an insert, delete or update operation. If not, in step 202, the SQL statement is executed. Step 204 determines whether alter mode was set in the same transaction. The same transaction refers to the transaction associated with the SQL operation. If not, the transaction is committed/rolledback. If the transaction was explicitly started by the user, then the user will explicitly commit or rollback the transaction using the "commit work" or "rollback work" SQL statement. If the transaction is implicitly started by the database server, then the database server implicitly commits the transaction if the operation succeeded, otherwise it will rollback the transaction.

If step 204 determines that alter mode was set in the same transaction, in step 206, alter mode is unset, and step 206 proceeds to step 208. If step 204 determines that alter mode was not set in the same transaction, step 204 proceeds to step 208.

If step 198 determines that the SQL operation is a DDL operation, step 212 determines whether a replicate is defined on the table. If not, step 212 proceeds to step 202 to execute the SQL statement. If step 212 determines that a replicate is defined on the table, step 212 proceeds via Continuator A to step 214 of FIG. 12B.

In step 214, the type of alter operation is found. Step 216 determines whether the alter is a fast alter. A fast alter may be an alter that adds SQL constraints, adds default values, drops SQL constraints and drops default values. A SQL constraint places a limit on the values that may be inserted into a column or table. If not, step 218 determines whether the table is already in alter mode. If not, in step 220, alter mode is set. Step 220 proceeds via Continuator D to step 202 of FIG. 12A.

If step 200 determines that the SQL operation is an insert, delete or update, step 200 proceeds via Continuator B to step 222 of FIG. 12C. Step 222 of FIG. 12C determines whether the table in alter mode. If so, step 224 determines whether the current thread is a replication thread. If not, in step 226, an error is returned. If step 222 determines that the table is in alter mode, step 222 proceeds via Continuator D to step 202 of FIG. 12A. If step 224 determines that the current thread is a replication thread, step 224 proceeds via Continuator D to step 202 of FIG. 12A.

If step 216 of FIG. 12B determines that the alter is a fast alter, step 216 proceeds via Continuator D to step 202 of FIG. 12A. If step 218 determines that the table is already in alter mode, step 218 proceeds via Continuator D to step 202 of FIG. 12A.

In some embodiments, users can explicitly set and unset the alter mode state on one or more replicated tables through a command line interface module instead of implicitly setting alter mode through a SQL alter statement which uses the pre-event notification and post event notification.

Using the command line interface, users can issue an alter mode set request before attempting alter operation(s) for one or more replicated table(s) and an alter mode unset request after completing alter operation(s) for one or more replicated tables. Using this approach for certain kinds of alter operations, users can reduce the amount of time for performing multiple alter mode set and unset operations for each alter operation. If the alter mode is set through the command line interface, the database engine will not invoke an alter mode set operation and alter mode unset operation as part of the SQL alter statement execution.

For example, to attach a new fragment to a replicated table the user manually sets and unsets alter mode through the command line interface. First the user will set alter mode on the replicated table, after that the user will drop the primary key on the replicated table, attach the new fragment to the replicated table and recreate the primary key on the replicated table. The user will then unset alter mode on the replicated table using the command line interface.

Figure 13:
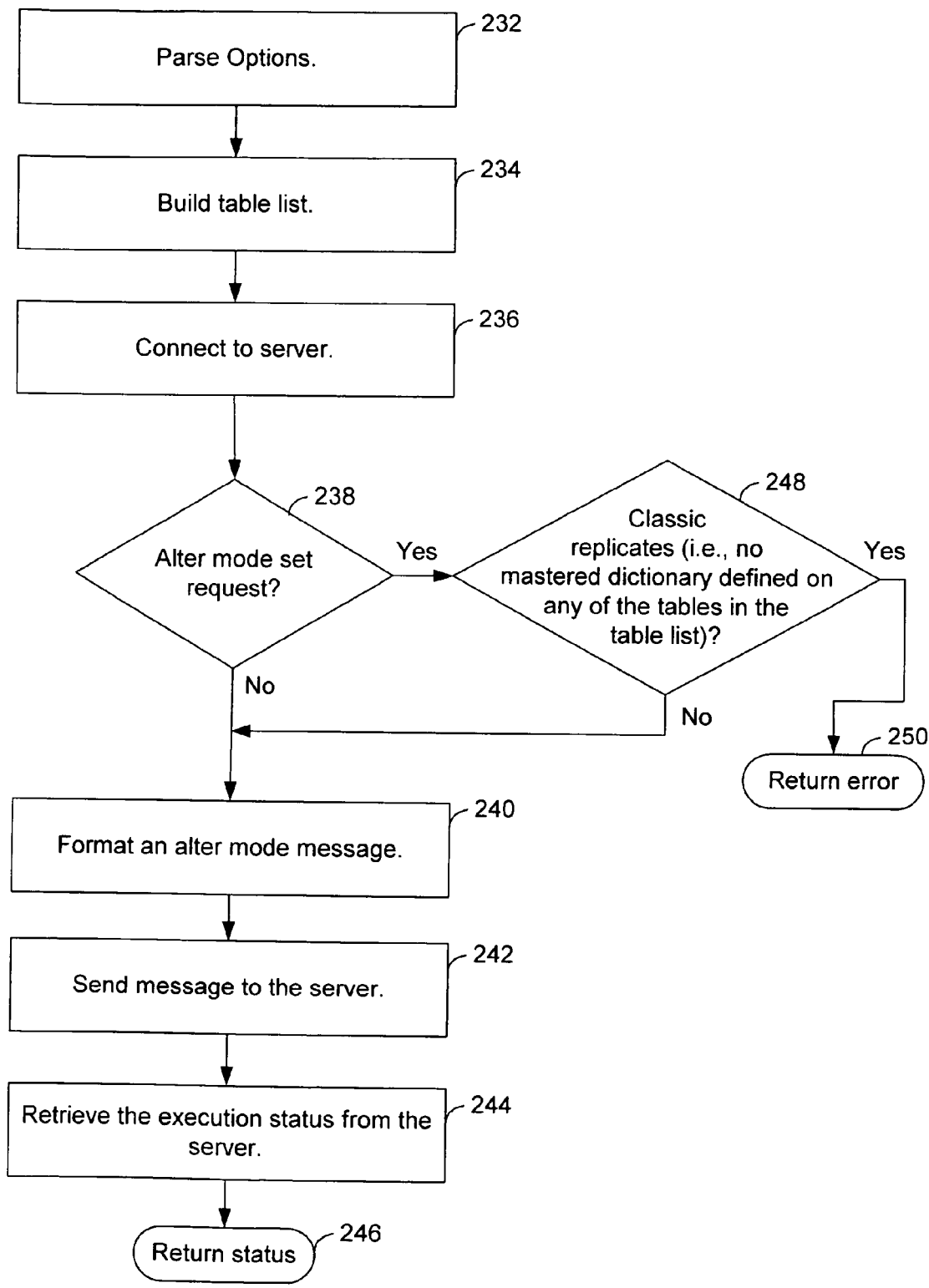
FIG. 13 depicts a flowchart of an embodiment of the alter mode set and unset operation in conjunction with a command line interface.

FIG. 13 depicts a flowchart of an embodiment of the alter mode set and unset operation in conjunction with a command line interface. When a user issues an alter mode set and an alter mode unset command using the command line interface, the user also specifies one or more tables that are to be placed in alter mode. In step 232, the options of the alter mode command are parsed. In step 234, a table list is built. The tables are those specified by the user in the alter mode set or unset command. Step 236 connects to a specified server. In some embodiments, the specified server name follows the "-connect" option. Step 238 determines whether an alter mode set request was received. If not, the alter mode request is an alter mode unset operation request and, in step 240, the alter mode request is formatted to an alter mode message. If the alter mode request is to set alter mode, the alter mode message is to set alter mode. If the alter mode request is to unset alter mode, the alter mode message is to unset alter mode. In step 242, the message is sent to the specified server. In step 244, the execution status of the alter mode message is retrieved from the server.

If step 238 determines that the alter mode request is an alter mode set request, step 248 determines whether classic replicates are used. Classic replicates do not have a mastered dictionary defined on any of the tables in the replicate. If not, mastered replicates are being used and step 248 proceeds to step 240 to format an alter mode message which sets alter mode. If step 248 determines that classic replicates are being used, in step 250, an error is returned.

Figure 14A:
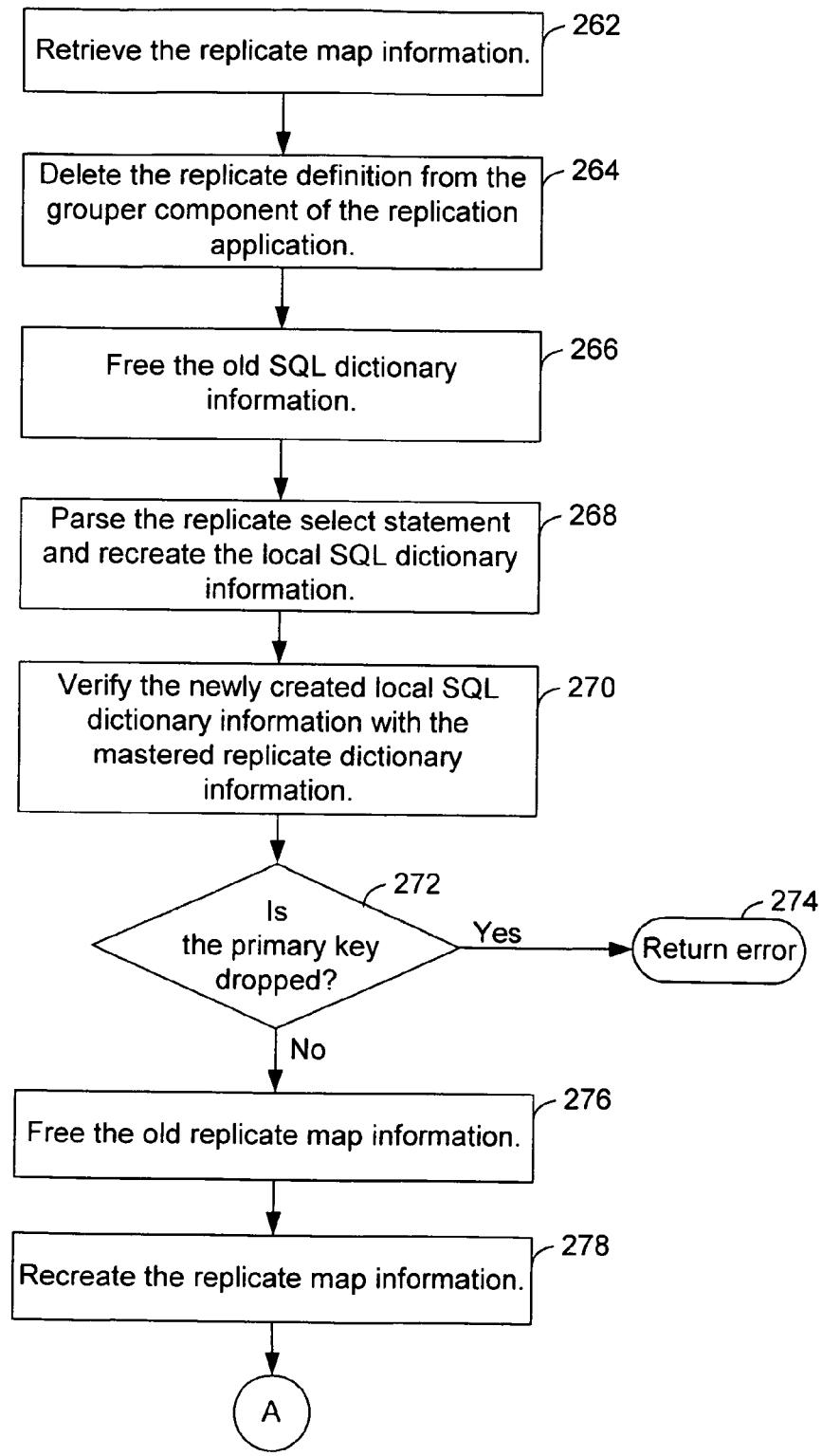
FIG. 14 comprises FIGS. 14A and 14B which collectively depict a flowchart of an embodiment of replicate reactivation of the alter mode unset operation.
Figure 14B:
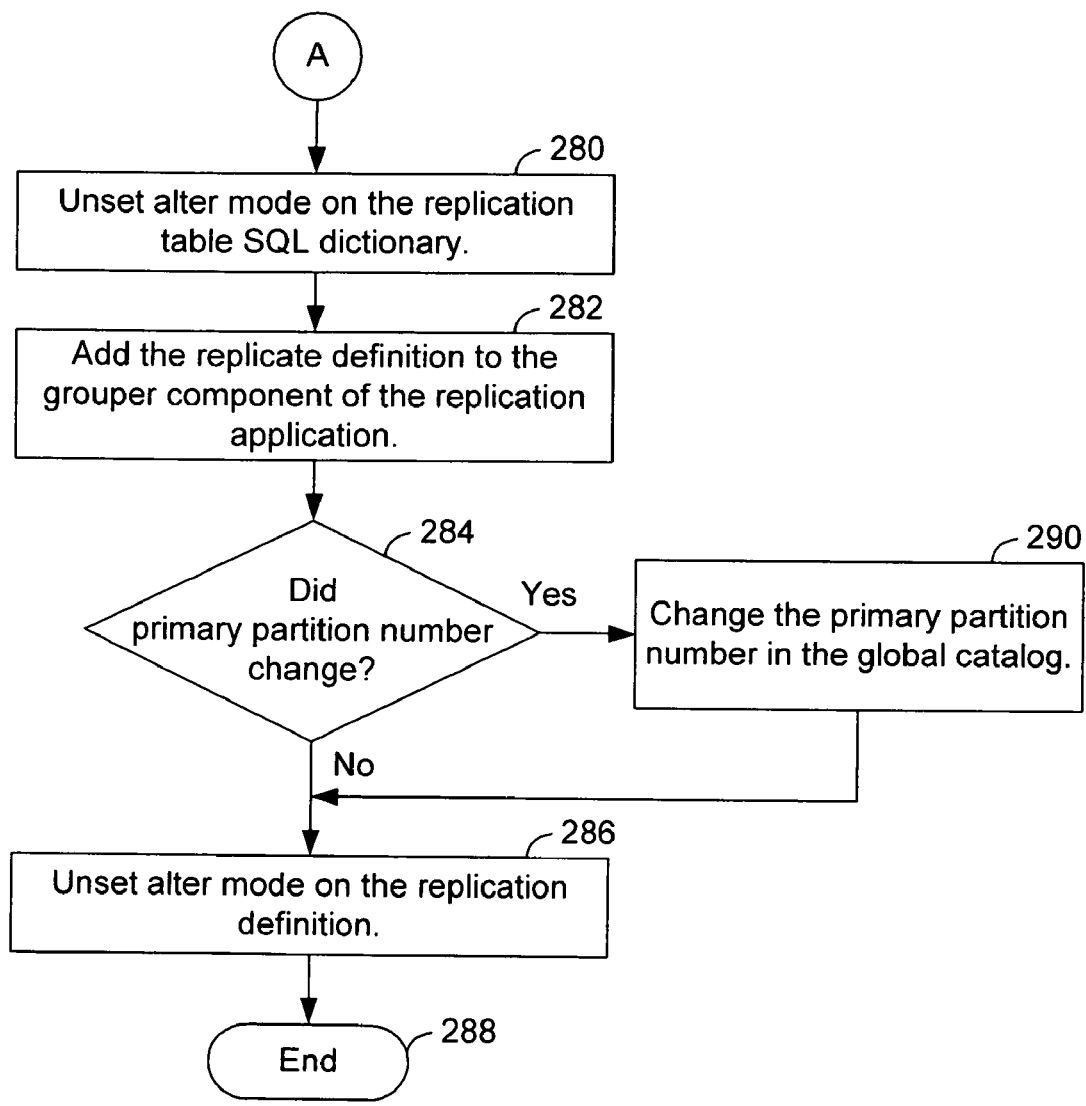

FIG. 14 comprises FIGS. 14A and 14B which collectively depict a flowchart of an embodiment of replicate reactivation of the alter mode unset operation. In replicate reactivation for an alter mode unset operation, the replicate definition is recycled to reflect the new schema changes to the replicate table definition. In various embodiments, the flowchart of FIG. 14 is implemented in the replication application.

In step 262, replicate map information is retrieved. Typically the replicate map is stored in a cache. The replicate map typically comprises information about the replicate definition specific to the local participant such as a reference to the replicate table dictionary information, a reference to the replicate mastered dictionary information, an attribute, for example, the data-conversion flag, which describes whether data conversion is to be performed between the local table dictionary format to the mastered dictionary format for transporting data and replicate column mapping information. Column mapping is used when the order of columns selected by the user in the replicate select statement and the physical order of the columns in the replicated table are different.

In step 264, the replicate definition is deleted from the grouper of the replication application. In step 266, the old SQL dictionary information is freed. In step 268, the replicate select statement which was used to create the replicate is parsed and the SQL dictionary information is recreated. The dictionary information recreated from the replicate select statement is in the local dictionary.

In step 270, the newly created local SQL dictionary information for the table is verified with the mastered replicate dictionary information for the table. Step 272 determines whether the primary key for the table was dropped. If so, in step 274, an error is returned. If the primary key was not dropped, in step 276, the old replicate map information is freed. In step 278, the replicate map information is recreated. Step 578 proceeds via Continuator A to step 280 of FIG. 14B.

In step 280, alter mode is unset on the replication table SQL dictionary. The SQL dictionary is an in-memory copy of the replicated table schema. Alter mode is set on the SQL dictionary as part of the alter mode set operation after setting alter mode on the replicated table's partition header. In step 282, the replicate definition is added to the grouper component of the replication application. Step 284 determines whether the primary partition number changed. If not, in step 286, the alter mode is unset on the replicate definition. In various embodiments, the replicate-alter mode-flag is unset. In step 288, the flowchart ends.

If step 284 determines that the primary partition number changed, in step 290, the primary partition number is changed in the global catalog.

Using various embodiments above, the replication application can sustain schema changes in a non-stop environment without causing downtime to the client applications.

Mastered Replicates

As described above, various embodiments of the replication application support multi-node peer-to-peer replication. In a multi-node peer-to-peer replication environment, it is possible that the definition for a table may not be identical on two participants or nodes. Sometimes the differences may be tolerated. For instance, intra-node replication of large object types is permissible. For example, the IBM Informix dynamic server (IDS) has four basic types of large objects such as binary large objects (BLOBS), BYTES, TEXT, and CLOBS. In addition, there are two large categories of BYTE and TEXT objects, referred to as partition blobs and blobspace blobs. In some embodiments, within a database server and the replication application, all large object types (LOBS) are considered to be equivalent. There are additional data types which are considered equivalent if they represent distinct variables of the same fundamental data type. For instance, if a serial column on one node is fundamentally an integer type, that serial column can successfully replicate to an integer column on a target node.

In one replication application, there is no control of what can replicate to what. This presents a potential problem because it might be possible that a given source data type can not successfully replicate to a different target data type. For instance, the source might define a field as CHAR(4), but the target might define the same field as an integer column. This will successfully replicate, but would result in garbage. Therefore, there is a need to monitor source and target data types so that replication will succeed.

In various embodiments, it is advantageous to have the data that is being transported from a given source to be in a common format which is known by all replication servers or nodes participating in a replicate. The mastered replicate provides a common format for the transport data which is used to replicate a data from a source server to one or more target servers of the replicate.

Column attributes of the table on various nodes may diverge during schema evolution. In various embodiments, using a common transport format allows differences between the local format of the table on various nodes to be accommodated. For example, a column on one server may have a data type of CHAR(10), but on another server, the same column may have a data type of VARCHAR. By allowing a given source to have the ability to convert the local format of the row into the common transport format and then have the target convert the common transport format into the local format of the row, some differences may be tolerated between the column attributes on a source and the targets.

A mastered replicate is a replicate which contains additional dictionary information which describes the replicate definition. The additional dictionary information is typically stored in the global catalog. In various embodiments, a replicate is defined using a query statement against the table being replicated. The query statement is typically a SQL select statement. By specifying a node which can be used to obtain a description of the columns included in the query used to define the replicate, the mastered dictionary information can be generated based on the description, and used to describe the replicate transport format.

In various embodiments, as participants are added to the replicate, a local description of the columns of the table(s) is defined and compared against the mastered dictionary. If the description of the replicated columns in the local dictionary on the participant does not match with the description of those replicated columns in the mastered dictionary, then the addition of the participant is rejected as being incompatible.

As replication is started on each participant or node within the replicate domain, the dictionary of the mastered replicate, that is, the mastered dictionary, is compared to the local replicate definition. Based on the comparison, if the mastered dictionary matches the local dictionary of the table for the replicated columns, the movement of data for that local table to and from the queue will be performed in a conventional manner. If the mastered dictionary does not match the local dictionary of the table for the replicated columns, then column conversion is performed as data is moved from and to the transport queue.

In some embodiments, the mastered replicate can be defined to perform verification of column names. If column names are being verified, the mastered replicate can be remastered. This means that the column names on all of the participants or nodes of the replicate are consistent as well as the column attributes. The column attributes can be revised and/or columns can be added and dropped from the replicate definition using a single command. If the mastered replicate is not performing name verification, the user can explicitly redefine the mastered replicate using a shadow replicate and swap the shadow replicate with the original primary mastered replicate.

The creation of a mastered replicate will be described by way of example using the IBM Informix dynamic server. However, the mastered replicate is not meant to be limited to the IBM Informix dynamic server, and the mastered replicate may be used with other database management systems.

In one embodiment, the mastered replicate is created in response to adding a mastered replicate option when defining a replicate. For example, in the IBM Informix dynamic server, a mastered replicate is created by adding "-master=server_name" to the "cdr define replicate" command.

In another embodiment, an option may be specified when defining a replicate to turn off column name verification. For example, in the IBM Informix dynamic server, an optional "-noname" can be added to define replicate command to turn off column name verification. If the "-noname" option is omitted when creating a mastered replicate, column name verification will be turned on.

When the replicate is defined as a mastered replicate, the replication application attaches to the server specified by the "-master" option. The replication application obtains the catalog information which describes the replicate columns from the server specified by the "-master" operation. The mastered dictionary is stored in the global catalog.

Figure 15:
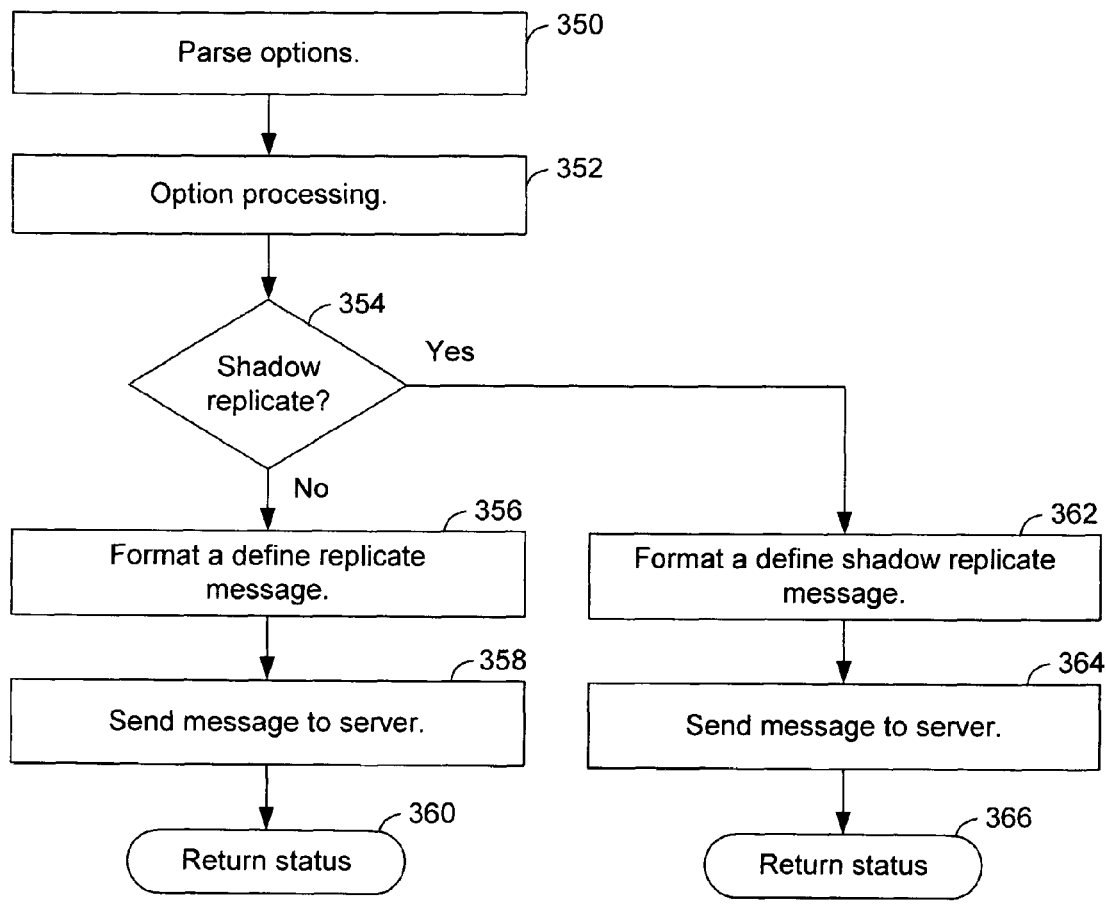
FIG. 15 depicts a flowchart of an embodiment of the operation of the replication application command line interface in response to a define replicate command.

FIG. 15 depicts a flowchart of an embodiment of the operation of the replication application command line interface in response to a define replicate command. In step 350, the options of the define replicate command are parsed. In step 352, the options are processed. Step 354 determines if the define replicate command is for a shadow replicate. If not, in step 356, a define replicate message is formatted. In step 358, the message is sent to the server specified as the connect server when the replicate is defined. The server performs the define replicate command. In step 360, the status of the define replicate command is returned. The status indicates the success or failure of the define replicate command.

In response to step 354 determining that the define replicate command defines the replicate as a shadow replicate, in step 362, a define shadow replicate message is formatted. In step 364, the define shadow replicate message is sent to the server. The server is that server specified as the connect server in the options of the define replicate command. The connect server performs the define replicate operation in accordance with the options to define a shadow replicate. The global catalog is updated with the replicate description. In step 366, the status of the define replicate command is returned.

Figures 16, 16A:
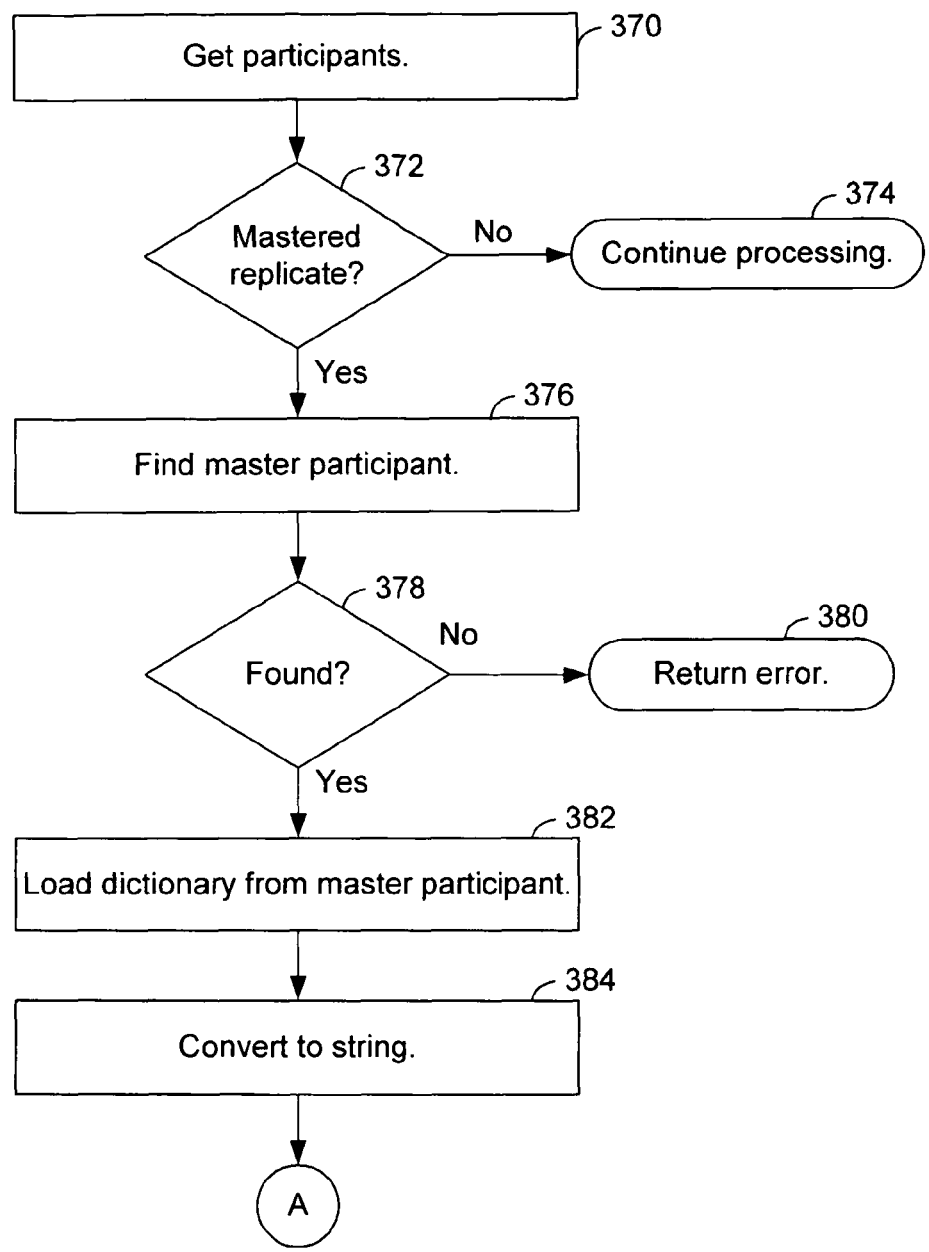
FIG. 16 comprises FIGS. 16A and 16B which collectively depict a flowchart of an embodiment of the option processing of FIG. 15.
Figure 16B:
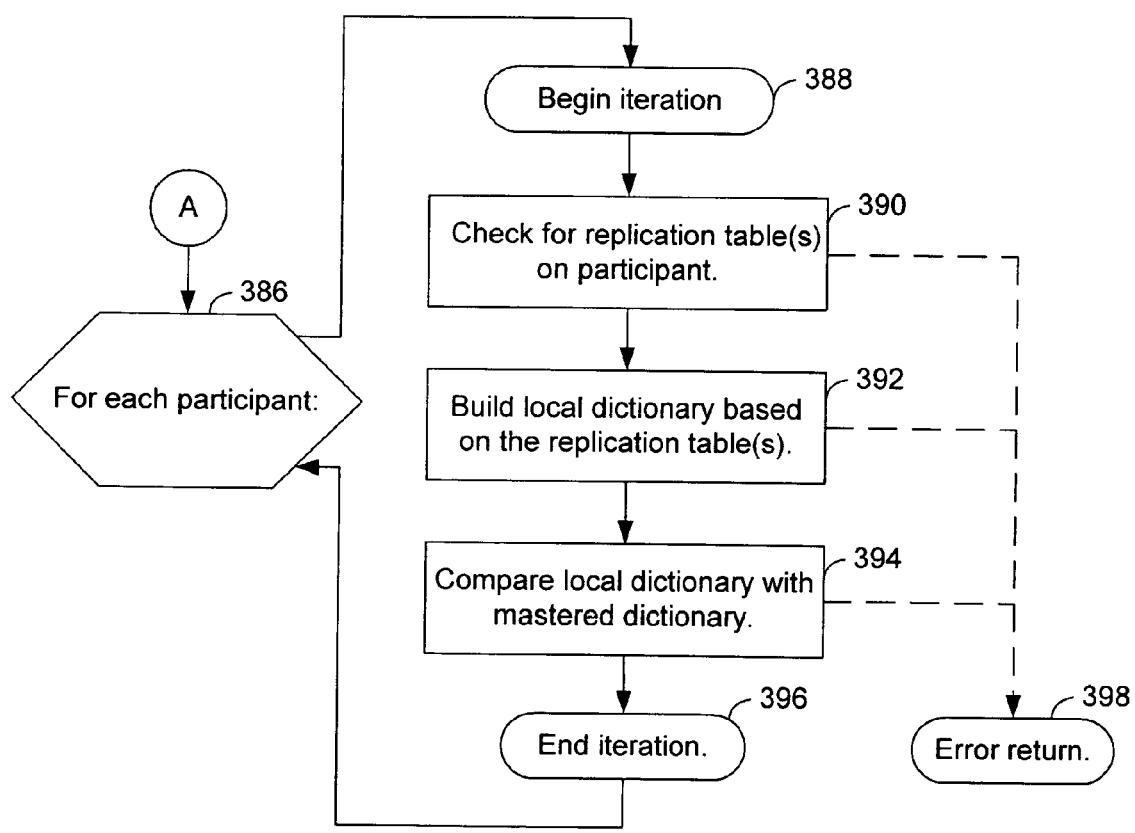

FIG. 16 comprises FIGS. 16A and 16B which collectively depict a flowchart of an embodiment of step 352 of FIG. 15 which performs option processing. Step 370 gets the participants of the replicate that were specified in the define replicate command. Step 372 determines whether the define replicate command specifies a mastered replicate. In other words, step 372 determines whether the define replicate command has a "-master" option. If not, in step 374, the define replicate command continues to be processed as a non-mastered replicate.

In response to step 372 determining that the define replicate command specifies the mastered replicate option, in step 376, a search is performed to find the specified master participant. The master participant is specified by the "-master" option. Step 378 determines if the master participant is found. If not, in step 380, an error is returned. In step 382, the dictionary from the specified master participant is loaded to provide the mastered dictionary. In some embodiments, the description for the replicated columns in the local dictionary from the specified master participant is loaded into the mastered replicate definition tables which will be described in further detail below. The dictionary information for the replicate is retrieved by issuing a "describe" statement on the query used to define the replicate, and by extracting information from the system catalog of the master server or node. In this way, the column attributes as well as constraint information on the table are extracted from the local dictionary to provide mastered dictionary information. In step 384, the mastered dictionary is converted into a string. Step 384 continues via Continuator A to step 386 of FIG. 16B.

In step 386, each participant of the replicate is evaluated. In step 388, the iteration begins. In step 390, the replication application checks the participant for replication table(s) of the replicate. In other words, the replication application checks to see if the table(s) exist on the participant. In some embodiments, if the table is missing on a participant, the replication application generates the table based on the mastered replicate dictionary information.

In step 392, a local dictionary is built. The local dictionary is built based on the replication tables. In step 394, the local dictionary is compared to the mastered dictionary. Based on the comparison, if the local dictionary is compatible with the mastered dictionary, in step 396, the iteration ends for that participant. Step 396 proceeds to step 386 to evaluate the next participant. Based on the comparison, if the local dictionary is not compatible with the mastered dictionary, in step 398, an error is returned.

If step 390 determines that the participant does not have any replication tables, in step 398, an error is returned. If in step 392 the local dictionary cannot be built, in step 398, an error is returned.

In various embodiments, the mastered replicate definition is stored in the metadata of the replication application as part of the replicate definition in the global catalog. In one embodiment, the mastered replicate definition tables used to store the mastered replicate definition comprise a mastered replicates table and a mastered system columns table. For extended data types, the mastered replicate definition also comprises a mastered system extended data types table and a mastered system attributes table.

An embodiment of the mastered replicates table is created as follows:

```
create table mastered_replicates_tab (
    replid      integer,    { replicate key }
    flags       integer,    { table flags }
    tabserver   lvarchar,   { master server }
    tabdb       lvarchar,   { master database }
    tabowner    lvarchar,   { table owner }
    tabname     lvarchar    { table name }
) lock mode row;
```

The replid field contains the replicate identifier and is used as a key. The flags field comprises the locking mode of the replicated table, for example 'row lock' or page 'lock,' and whether the table contains special shadow columns used to resolve replication conflicts while applying replication data. The tabserver field, that is, the master server, is designated by the "-master" option when the mastered replicate is created. The master database is the database on the master server where master table definition resides from which the mastered dictionary is constructed. The tabname field contains the name of the mastered table from which mastered dictionary is constructed. The tabowner field contains the owner of the mastered table specified in tabname. In various embodiments, the combination of the table owner and table name is used to identify a table.

The mastered system columns table specifies the columns which are replicated. An embodiment of the mastered system columns table is created as follows:

```
create table mastered_syscolumns_tab (
    replid        integer,     { replicate key }
    selectnum     smallint,    { order of selection }
    name          lvarchar,    { name of column }
    pknum         smallint,    { order within primary key }
    coltype       smallint,    { field type }
    collength     smallint,    { column length }
    extended_id   integer      { extended id of column }
) lock mode row;
```

The pknum, or "order within primary key" field specifies the position of the column within the primary key. The coltype, that is, the "field type" field contains the data type of the column. The extended_id field is used if the data type is an extended data type and is used to reference the mastered system extended data types table and the mastered system attributes table.

An embodiment of the mastered system extended data types table is created as follows:

```
create table mastered_sysxtdtypes_tab (
    replid        integer,     { replicate key }
    extended_id   integer,     { extended id }
    mode          char(1),     { mode }
    name          lvarchar,    { name of extended type }
    type          smallint,    { type of extended type }
    align         smallint,    { alignment of extended type }
    source        integer,     { source type of extended type }
    maxlen        integer,     { max length of extended type }
    length        integer      { length of extended type }
) lock mode row;
```

An embodiment of the mastered system attributes table is created as follows:

```
create table mastered_sysattr_tab (
    replid         integer,     { replicate }
    extended_id    integer,     { Extended id of this attribute }
    seqno          smallint,    { Seq number of the attribute }
    levelno        smallint,    { nesting of this entry }
    fieldno        smallint,    { field number of entry }
    fieldname      lvarchar,    { Name of this entry }
    type           smallint,    { type of field }
    length         smallint,    { Length of field }
    xtd_type_id    integer      { extended type of field }
) lock mode row;
```

When a participant is started, including recovery restart, one or more global catalog routines of the replication application verify that the information in the current local dictionary for the replicated table matches the mastered replicate dictionary. If the information in the dictionaries does not match, the replication server will provide a warning which indicates that remastering is advisable and flag the replicate for conversion either to or from the mastered replicate definition. In other words, a data-conversion flag is set for the replicate.

Figure 17:
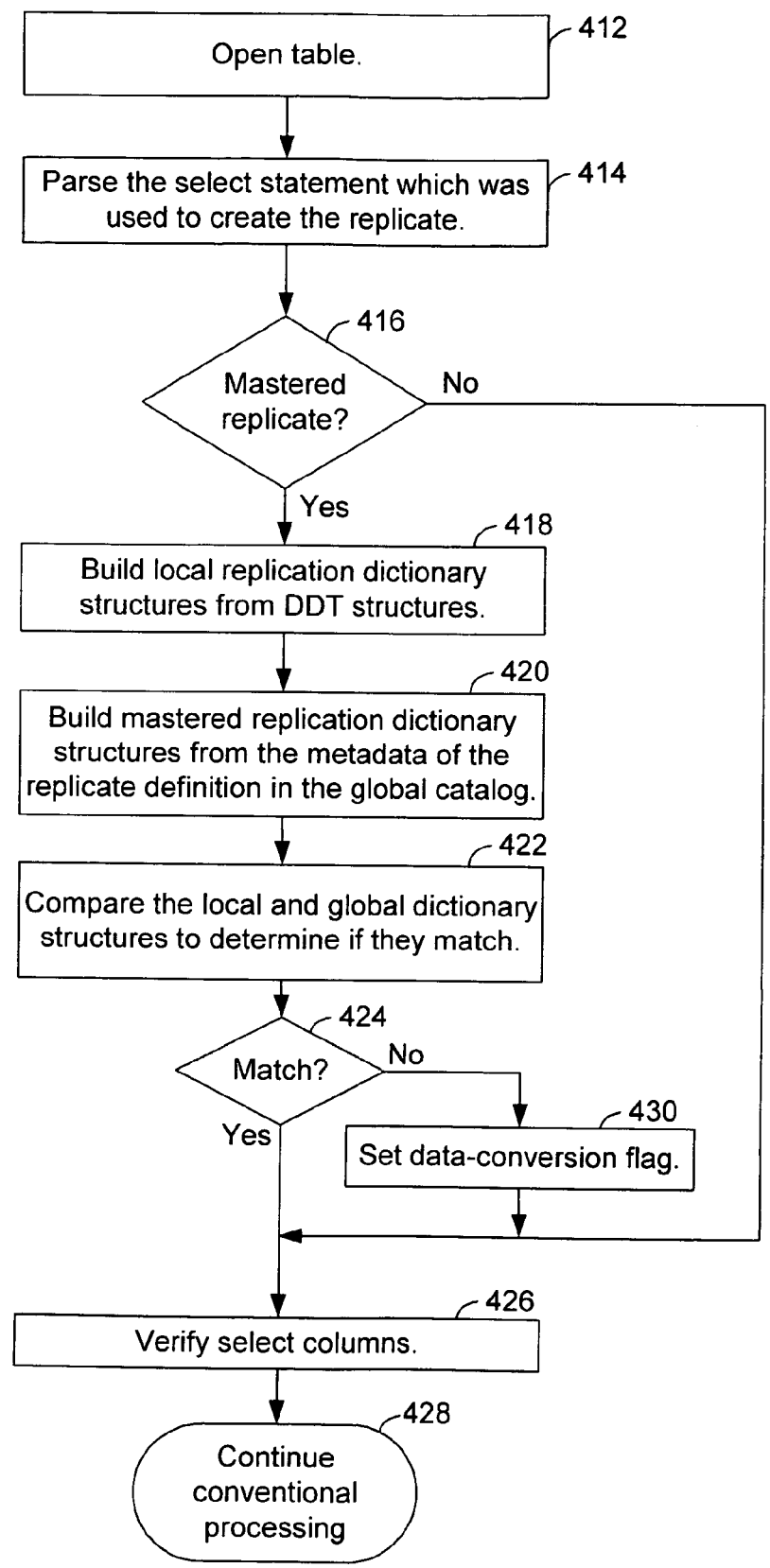
FIG. 17 depicts a flowchart of an embodiment of the verification of the dictionary information of a participant when the participant is restarted.

FIG. 17 depicts a flowchart of an embodiment of the verification of the dictionary information of a participant when the participant is restarted. The flowchart of FIG. 17 is incorporated in one or more global catalog routines of the replication application. In step 412, the replication table is opened. In step 414, the select statement which was used to create the replicate is processed. The select statement for the replicate is retrieved from the global catalog, and the columns specified in the select statement are identified. Step 416 determines if the replicate is a mastered replicate. If so, in step 418, local replication dictionary structures are built from data dictionary table (DDT) structures. In step 420, mastered replicate dictionary structures are built from the metadata of the replicate definition in the global catalog. In step 422, the local and mastered dictionary structures are compared to determine if they match. Step 424 evaluates the determination of step 422. If the local and mastered dictionary structures match, in step 426, the select columns are verified. If the column verification attribute is set on the replicate definition, then column names in the local table dictionary are verified against the column names in the mastered dictionary. In step 428, conventional processing is continued. If step 416 determines that the replicate is not a mastered replicate, step 416 proceeds to step 426. If step 424 determines that local and mastered dictionary structures do not match, in step 430, a data-conversion flag is set for the replicate. The data-conversion flag indicates that the common data format of mastered replicates should be used to transport data. In some embodiments, the replication application also provides a warning that remastering is advisable.

It is possible that the local row will not match the mastered replicate dictionary. This may happen during schema evolution as schema changes are being done throughout the replication domain, that is, the participants of the replicate. Even if the local table definition no longer matches the mastered replicate dictionary, using the replication application, the data that is placed into the send queue matches the format that other participants expect.

Figure 18:
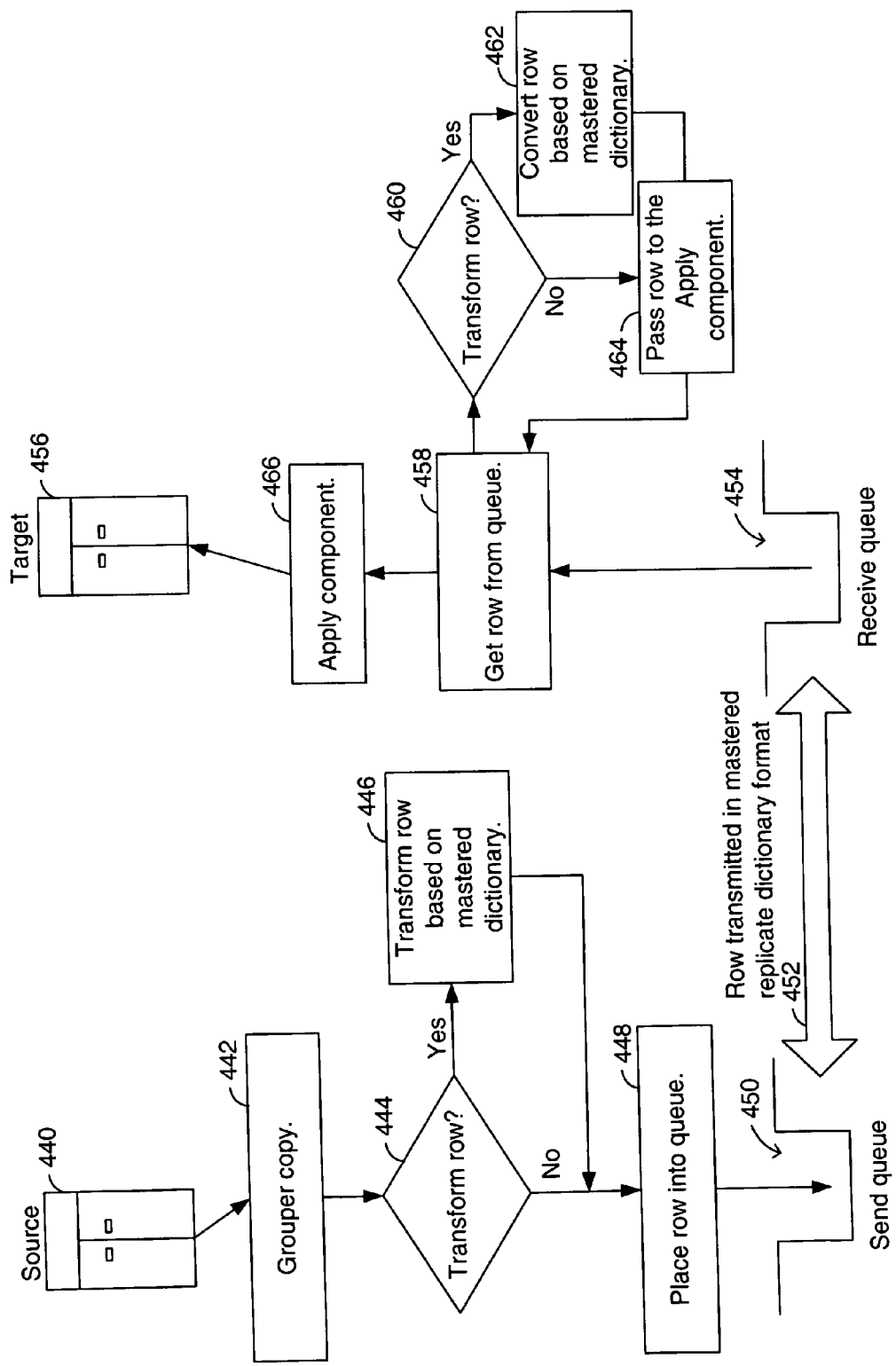
FIG. 18 depicts a diagram of an embodiment of transmitting a row in the mastered replicate dictionary format.

FIG. 18 depicts a diagram of an embodiment of transmitting a row in the mastered replicate dictionary format. A source server 440 has a database. A log contains a history of the changes to the database. As described above with respect to FIG. 2, a snooper and grouper 442 copies records of interest from the log and groups the records of interest to reconstruct transactions. Step 444 determines if the row is to be transformed into the mastered replicate dictionary format. The replication application determines if the row needs to be transformed to the mastered replicate dictionary format. For example, if the format of the local table was altered to insert a new column, the replication application will not send the data associated with that new column. If the format of the local table was altered to change one or more attributes of a column that was being replicated, column conversion will be performed using data casting. For example, if a column was changed from integer to floating point in the new local dictionary format, and the mastered dictionary uses a data type of integer for the column, a routine will be performed to cast the new floating point data to an integer.

If so, in step 446, the row is transformed using the mastered catalog, that is, the description of the transport format of the mastered replicate. In step 448, the row is placed in the send queue 448. If step 444 determines that the row is not to be transformed, step 444 proceeds to step 448.

In response to placing the row in the send queue, as shown by arrow 452 the row is transmitted to a receive queue 454 on the target server 456. Step 458 gets the row from the receive queue. As part of getting the row from the receive queue, step 460 determines if there is a need to transform the row from the mastered replicate dictionary format to the local format on the target server. If so, in step 462, the row is converted to the local dictionary format using the mastered catalog. In step 464, the row is passed to the apply 466 at the target server. The apply component 466 applies the row to a table in the database on the target server 456.

Figure 19:
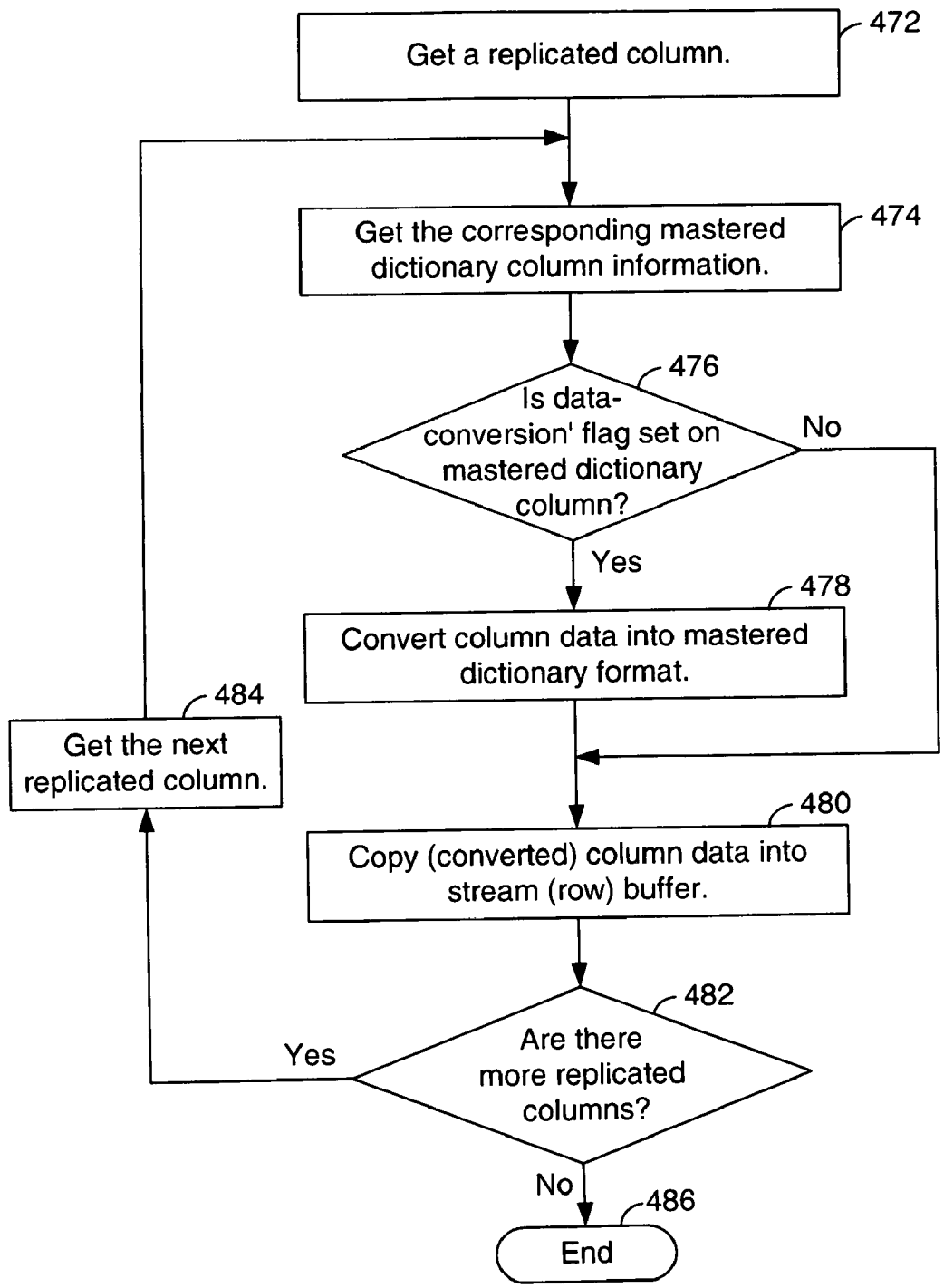
FIG. 19 depicts a flowchart of an embodiment of column conversion performed by the grouper of FIG. 18.

FIG. 19 depicts a flowchart of an embodiment of column conversion performed by the grouper 442 of FIG. 18. Step 472 gets a replicated column. Step 474 gets the corresponding mastered dictionary column information for the replicated column. Step 476 determines whether the data-conversion flag is set on the mastered dictionary column information for the replicate. The data-conversion flag is set in step 430 of FIG. 17. If the data-conversion flag is set, in step 478, the column data is converted into the mastered dictionary format. In step 480, the converted column data is copied into a stream buffer or row to be sent via the send queue. Step 482 determines whether there are more replicated columns. If so, step 484 gets the next replicated column and proceeds to step 474. If step 482 determines that there are no more replicated columns to check for conversion, step 482 proceeds to step 486 to exit.

If step 476 determines that the data-conversion flag is not set, step 476 proceeds to step 480 and the replicated data is not converted into the common data format of a mastered replicate.

Figure 20:
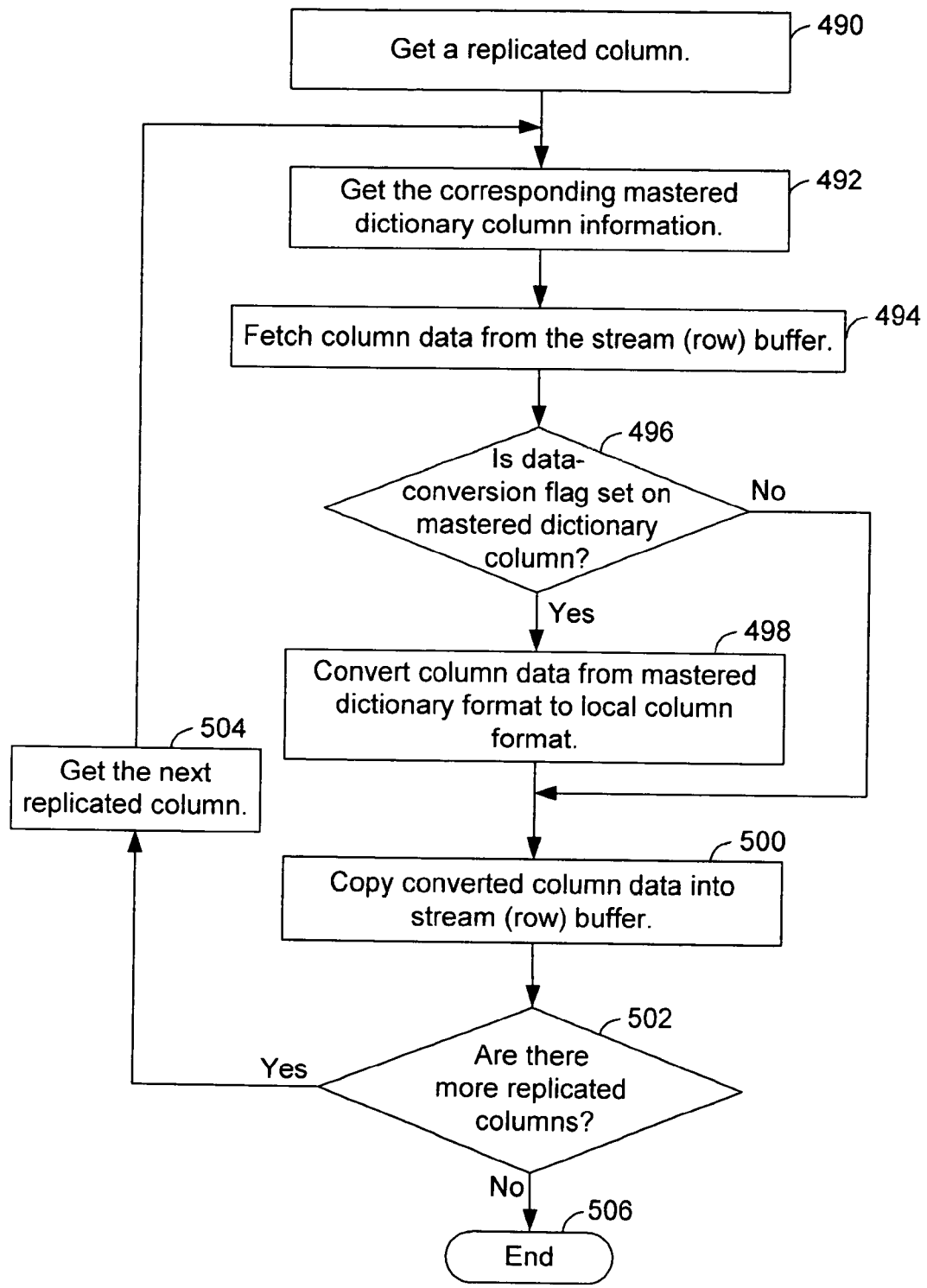
FIG. 20 depicts a flowchart of an embodiment of column conversion in connection with the apply component of FIG. 19.

FIG. 20 depicts a flowchart of an embodiment of the column conversion in connection with the apply component 466 of FIG. 18. Step 490 gets a replicated column. Step 492 gets the corresponding mastered dictionary column information for the replicated column. Step 494 fetches column data from the stream (row) buffer, and in some embodiments, the receive queue. Step 496 determines whether the data-conversion flag is set on the mastered dictionary column. If so, in step 498, the column data is converted from the mastered dictionary format to the local column format. In step 500, the column data or the converted column data is copied into the stream buffer (row). Step 502 determines whether there are more replicated columns to check for conversion. If so, step 504 gets the next replicated column, and proceeds to step 492.

If step 496 determines whether the data-conversion flag is not set on the mastered dictionary column, step 496 proceeds to step 500. If step 502 determines that there are no more replicated columns to check for conversion, step 502 proceeds to step 506 to end the flowchart.

In various embodiments, the column conversions are performed by routines within the server which perform data casting.

For example, consider a bi-directional replication in which a table, called Tab1 is replicated between database server-A and database server-B. Tab1 has a first column named "col1" of type integer and a second column named "col2" of type integer. The replicate name is "repl1" and is a primary mastered replicate. At any point in time, changes for Tab1 may exist in a send queue on database server-A and additional changes for Tab1 may exist in a send queue on database server-B. Tab1 is altered to modify the data type for column "col2" from integer to floating point at server-A. Server-A marks repl1's replicate definition with the data-conversion flag, in other words, the data-conversion flag is set. At this point, server-A converts data for the column "col2" from floating point format to integer format while converting row data from the local dictionary format to the mastered dictionary format for transportation. While receiving data, server-A converts data for the column "col2" from integer format to the floating-point format while converting data from the mastered dictionary format to the local dictionary format before applying the row data to the replication table Tab 1.

Tab1 at server-B is also altered to modify the data type for column "col2" from integer to float data type. Server-B also marks repl1's replicate definition with the data-conversion flag. At this point, server-B converts data for column "col2" from floating point format to integer format while converting row data from the local dictionary format to mastered dictionary format for transportation. While receiving data, server-B converts data for the column "col2" from integer format to the floating-point format while converting data from the mastered dictionary format to the local dictionary format before applying the row data to the replication table Tab1.

Next, the user wants to modify the mastered dictionary format to change the data type of "col2" from integer to float to avoid data conversion between the mastered dictionary format and the local dictionary format. The user performs a remastering operation on the replicate "rep1" to modify the mastered dictionary and therefore the transportation format to change the data type for "col2" from integer to floating point. As part of the remastering operation, a new shadow mastered replicate is created based on the primary mastered replicate "rep1." At this point the new shadow mastered replicate becomes the primary mastered replicate and the old primary mastered replicate becomes the shadow mastered replicate. The replication node will delete the shadow mastered (old primary mastered) replicate when the replicate definition is no longer used. After remastering, the local dictionary matches the mastered dictionary. Hence, no data conversion between the mastered dictionary format and the local dictionary format is performed while transporting data for Tab1.

Using the replication application, the user may remaster a mastered replicate. In some embodiments, remastering the mastered replicate is performed by the technique of FIG. 21. In various embodiments, remastering is performed if the mastered replicate is performing column name verification.

Figure 21:
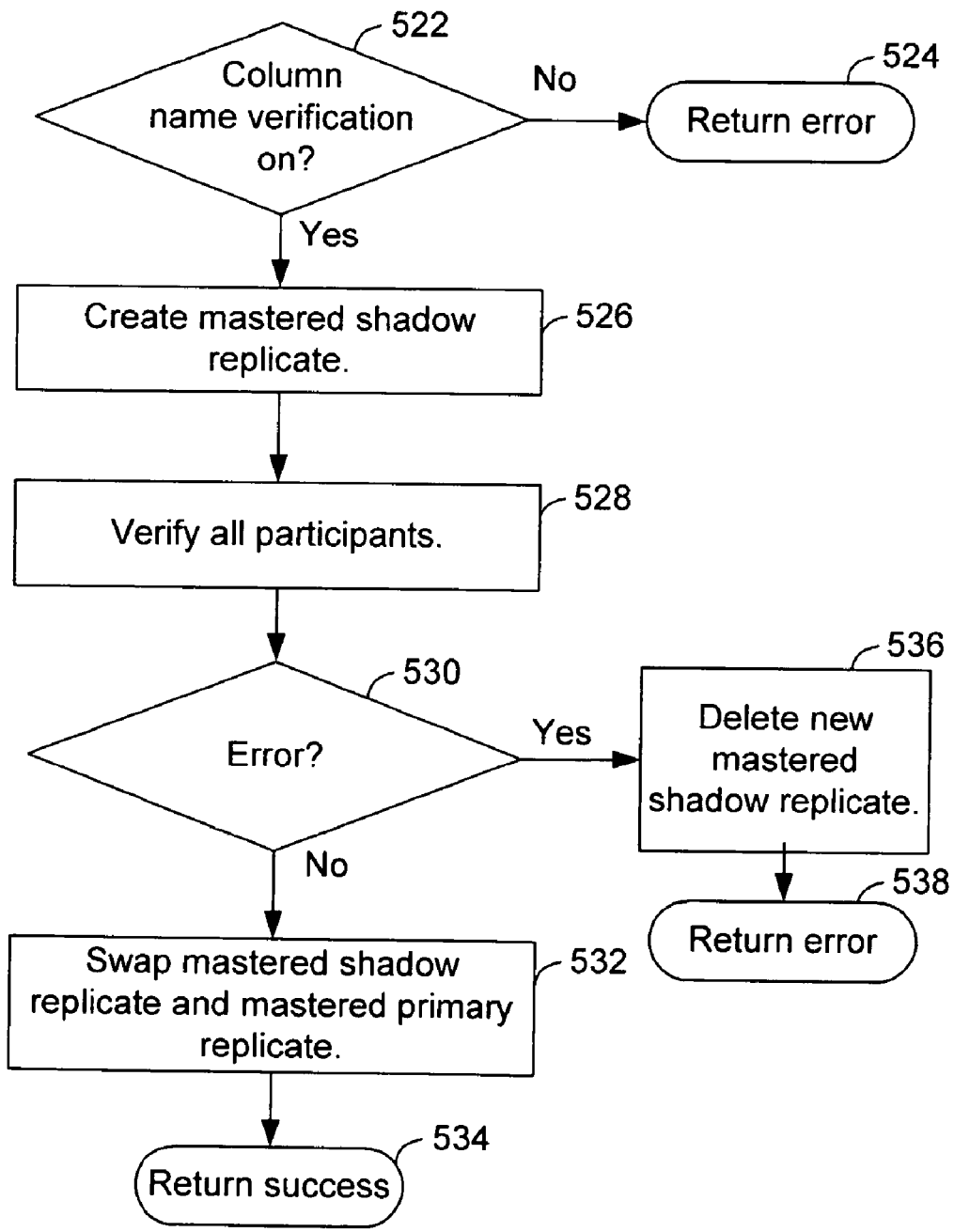
FIG. 21 depicts a flowchart of an embodiment of remastering a replicate.

FIG. 21 depicts a flowchart of an embodiment of remastering a replicate. In some embodiments, the flowchart of FIG. 21 is performed in response to a remaster command. For example, after adding a column to a replicated table at all replicate participant nodes, the user can remaster the replicate to add newly added column to the replicate definition. After remastering, data for the newly added column also will be replicated. As part of the remastering process, a shadow replicate is created which comprises the new column. The shadow replicate is swapped with the original replicate. Since the apply component treats the replicates as equivalent, the apply can process data from either replicate while sending data in the new replicate. If remastering is not performed, data for the newly added column will be discarded at the source server while converting data from the local table dictionary format to the mastered dictionary format for transportation.

Step 522 determines whether column name verification is on for the replicate. If not, step 524 returns with an error. If so, in step 526, a mastered shadow replicate is created. In step 528, all participants are verified. The verification of participants will be described in further detail with reference to FIG. 22. Step 530 determines if an error occurred during verification. If not, in step 532, the mastered shadow and primary replicates are swapped, and step 534 returns indicating success.

If step 530 determines that an error occurred during verification, in step 836, the new shadow replicate is deleted, and step 538 returns indicating an error.

In various embodiments, remastering can be manually performed when converting a non-mastered replicate into a mastered replicate, or if the mastered replicate is not performing column name verification. By using consistent column names, the complexity of setting up the projection lists for each of the replicates is reduced. The projection list is the list of column names in the select clause used to create the replicate, for example, "Select col1, col2 from Table." If the names col1 and col2 are used consistently across all replicate participants, one common select statement can be used for all the participants while remastering the replicate. Otherwise, the select statement is specified for each replicate participant. Some embodiments have a single projection list. However, the remastering process can be performed by manually generating a mastered shadow replicate consisting of one or more replication columns, and expanding this new mastered shadow replicate to include all of the participants in original replicate. The original mastered replicate is then swapped with the new mastered shadow replicate using a swap shadow replicate command.

Figure 22:
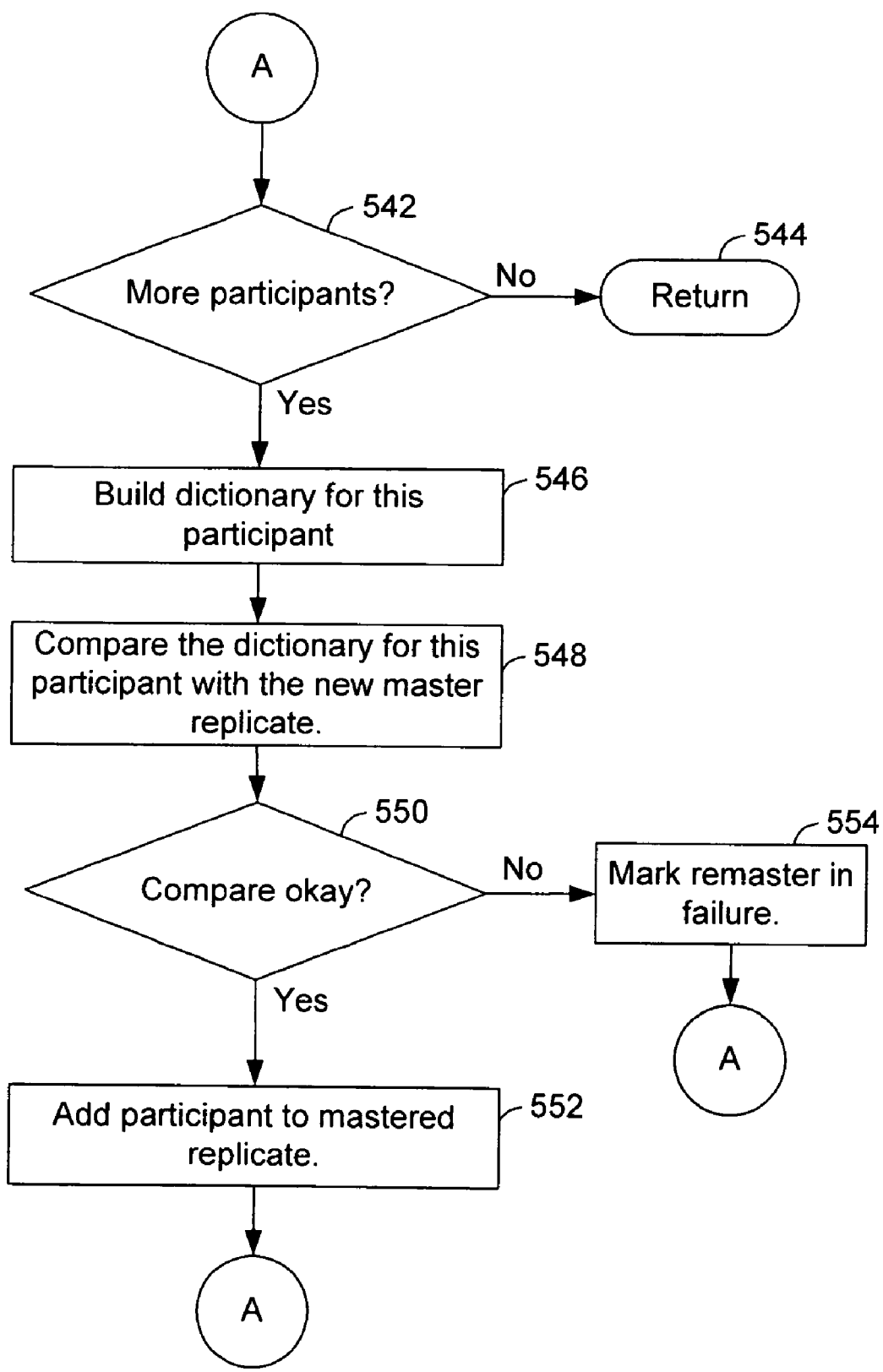
FIG. 22 depicts a flowchart of an embodiment of the step of verifying all participants of FIG. 21.

FIG. 22 depicts a flowchart of an embodiment of step 528 of FIG. 21 which verifies all participants. Step 542 determines if there are more participants to check. If not, step 544 returns. If so, in step 546, a dictionary is built for this participant. In step 548, the dictionary for this participant is compared to the dictionary of the new mastered replicate. Step 550 determines whether the comparison was okay, that is, whether the dictionaries are compatible, and in some embodiments, identical. If so, in step 552, the participant is added to the mastered replicate, and step 552 proceeds to step 542.

If in step 550 the comparison was not okay, in step 554, the remaster is marked as failed, and step 554 proceeds to step 542.

In another example, consider a bi-directional replication in which a table, called Tab1, is replicated between database server-A and database server-B. Tab1 has a first column named "col1" of type integer and a second column named "col2" of type integer. The replicate name is "repl1" and is a primary mastered replicate. At any point in time changes for Tab1 may exist in a send queue on database server-A and additional changes for Tab1 may exist in a send queue on database server-B. Tab1 is altered to add a new column, named "col3" of type integer at server-A. At this point, server-A discards data for the column "col3" while copying row data into the send queue for transportation because col3 is not part of the replicate. The data-conversion flag is not set when a column is added to a table. In addition, Tab1 at server-B is altered to add new column "col3" of type integer. At this point, server-B also discards data for column "col3" while copying row data into the send queue for transportation. Next the user wants to replicate data for the newly added column "col3." The user performs a remastering operation on the replicate "repl1" to include newly added column "col3" into the replicate definition select statement.

Figure 23:
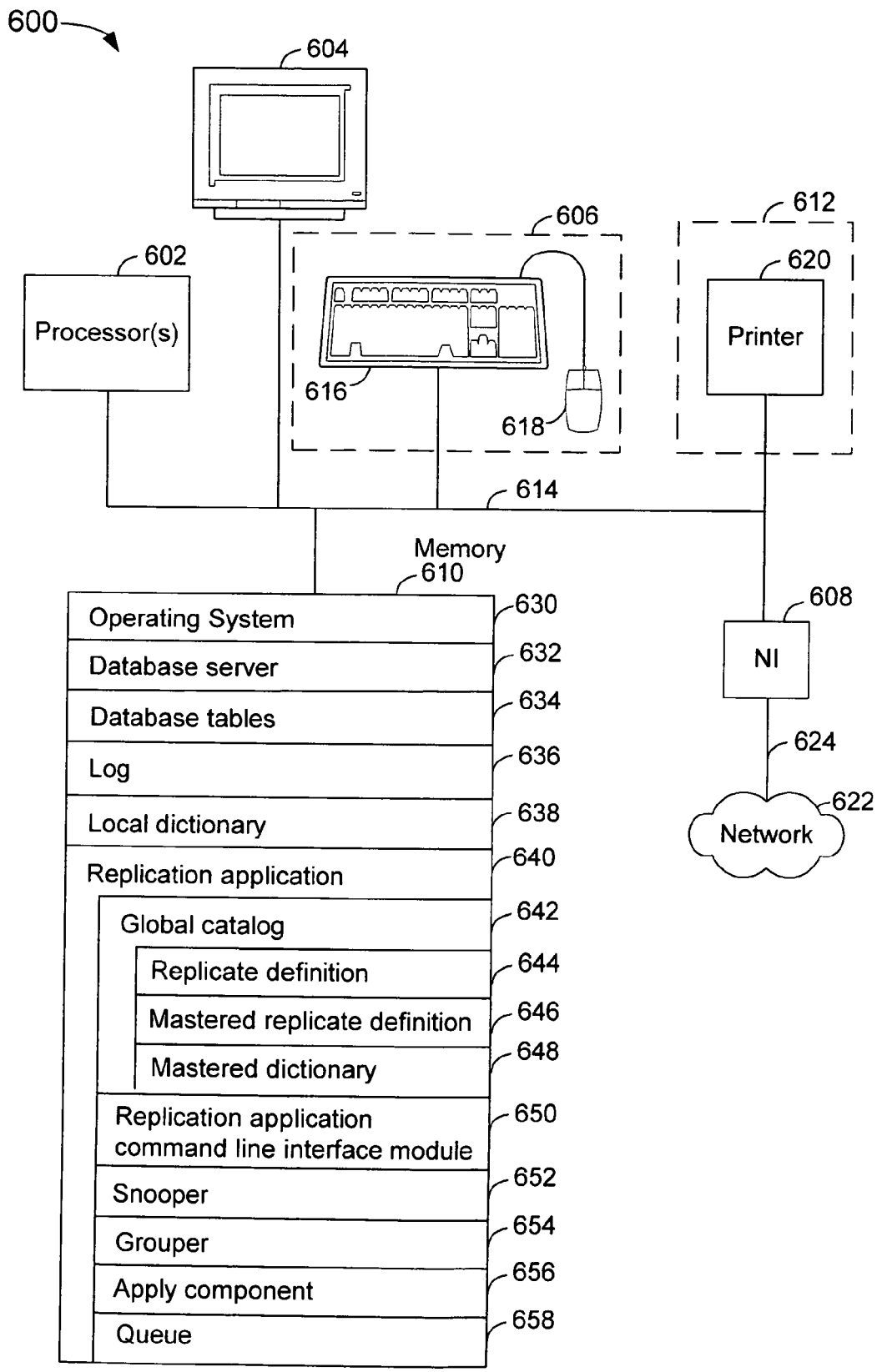
FIG. 23 depicts an illustrative computer system which uses various embodiments of the present invention.

FIG. 23 depicts an embodiment of an illustrative computer system which uses various embodiments of the present invention. The computer system 600 comprises processor(s) 602, display 604, input interfaces (I/F) 606, communications interface 608, memory 610 and output interface(s) 612, all conventionally coupled by one or more buses 614. The input interfaces 606 comprise a keyboard 616 and a mouse 618. The output interface 612 comprises a printer 620. The communications interface 608 is a network interface (NI) that allows the computer 600 to communicate via a network 622. The communications interface 608 may be coupled to the network 622 via a transmission medium 624 such as a network transmission line, for example twisted pair, coaxial cable or fiber optic cable. In another embodiment, the communications interface 608 provides a wireless interface, that is, the communications interface 608 uses a wireless transmission medium.

The memory 610 generally comprises different modalities, illustratively semiconductor memory, such as random access memory (RAM), and disk drives. In various embodiments, the memory 610 stores an operating system 630, a database server 632, database tables 634, a log 636, a local dictionary 638 and a replication application 640. In various embodiments the replication application 640 comprises a global catalog 642 which has a replicate definition 644, a mastered replicate definition 646 and a mastered dictionary 648. The replication application 640 also comprises a replication application command line interface module 650, a snooper 652, a grouper 654, an apply component 656 and a queue 658.

In various embodiments, the specific software instructions, data structures and data that implement various embodiments of the present invention are typically incorporated in the replication application 640. Generally, an embodiment of the present invention is tangibly embodied in a computer-readable medium, for example, the memory 610, and is comprised of instructions which, when executed by the processor 602, cause the computer system 600 to utilize the present invention. The memory 610 may store the software instructions, data structures and data for any of the operating system 630, a database server 632, database tables 634, a log 636, local dictionary 638, and replication application 640 in semiconductor memory, in disk memory, or a combination thereof. Other computer memory devices presently known or that become known in the future, or combination thereof, may be used for memory 610.

The operating system 630 may be implemented by any conventional operating system such as AIX® (Registered Trademark of International Business Machines Corporation), UNIX® (UNIX is a registered trademark of the Open Group in the United States and other countries), Windows® (Registered Trademark of Microsoft Corporation), Linux® (Registered trademark of Linus Torvalds), Solaris® (Registered trademark of Sun Microsystems Inc.) and HP-UX® (Registered trademark of Hewlett-Packard Development Company, L.P.).

In various embodiments, the database server 632 is the IBM Informix Dynamic Server. However, the invention is not meant to be limited to the IBM Informix Dynamic Server and may be used with other database management systems.

In various embodiments, the present invention may be implemented as a method, system, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over the network. The article of manufacture in which the code is implemented also encompasses transmission media, such as the network transmission line and wireless transmission media. Thus the article of manufacture also comprises the medium in which the code is embedded. Those skilled in the art will recognize that many modifications may be made to this configuration without departing from the scope of the present invention.

The exemplary computer system illustrated in FIG. 23 is not intended to limit the present invention. Other alternative hardware environments may be used without departing from the scope of the present invention.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A computer-implemented method, comprising:
    in response to at least one command, creating a first replicate specifying:
    a) a target replication server and a source replication server, wherein said target replication server has a first table with a table name and said source replication server has a second table with said table name,
    b) that changes to data in a first column of said second table are to be replicated,
    c) a first common dictionary format comprising a first column transport name corresponding to said first column of said second table and a first column transport data type corresponding to said first column of said second table, and
    d) a first local dictionary format specifying a first column name for a first column of said first table and a first data type for said first column of said first table, said first data type being different from said first column transport data type;
    verifying, by said target replication server, that said first column transport name is identical to said first column name of said first local dictionary format, and that said first data type is compatible with said first column transport data type;
    after said verifying, receiving, by said target replication server, replication data from said source replication server in said first common dictionary format, said replication data comprising at least one change to data in said first column of said second table;
    transforming, by said target replication server, said replication data from said first common dictionary format to said first local dictionary format; and
    applying, by said target replication server, said transformed replication data to said first table.

2. The method of claim 1 wherein a second local dictionary format specifies said first column name for said first column of said second table and specifies a second data type for said first column of said first column of said second table, the method further comprising:
    verifying, by said source replication server, that said first column transport name is identical to said first column name of said second local dictionary format, and that said second data type is compatible with said first column transport data type;
    after said verifying, receiving, by said replication server, additional replication data from said target replication server in said first common dictionary format, said additional replication data comprising at least one change to data in said first column of said first table;
    transforming, by said source replication server, said additional replication data from said first common dictionary format to said second local dictionary format; and
    applying, by said source replication server, said transformed additional replication data to said second table.

3. The method of claim 1 wherein said target replication server comprises a first database server and a replication application, the method further comprising:

receiving an alter command to alter said first local dictionary format of said first table;

in response to said alter command, first notifying by said first database server, said replication application that said first local dictionary format of said first table is to be altered;

after said first notifying, altering said first table in accordance with said command, wherein said first local dictionary format of said first table is altered in accordance with said alter command; and after said altering said first table, second notifying said replication application that said first table was altered.

4. The method of claim 3 wherein in response to said first notifying that said first local dictionary format of said first table is to be altered, suspending application of at least a subset of said replication data from said source replication server to said first table.

5. The method of claim 4 further comprising:
in response to said second notifying that said first table was altered, reactivating application of said at least a subset of said replication data from said source replication server to said first table.

6. The method of claim 3 further comprising:
identifying other replication data from a log on said target replication server; and prior to said altering, advancing a replay position, wherein said replay position indicates a position at which to begin reading said log after a failure of said database server of said target replication server.

7. The method of claim 3 further comprising:
prior to said altering said first table,
suspending application of at least a subset of said replication data from said source replication server to said first table;

determining a current position of writing change-data to a log; and advancing a replay position to said current position.

8. The method of claim 7 further comprising:
after said altering, reactivating application of said at least a subset of said replication data from said source replication server to said first table.

9. The method of claim 3 wherein said alter command specifies to add a new column to said first table, said new column having a new column name and a new data type.

10. The method of claim 3 wherein said alter command specifies to change said first data type of said first column of said table to another data type.

11. The method of claim 1 wherein said first replicate is a primary replicate, the method further comprising:
in response to at least one additional command, creating a second replicate specifying:

a) said target replication server and said source replication server, b) that said second replicate is associated with said first replicate, c) that said changes to data in said first column of said second table are to be replicated, and d) a second common dictionary format, wherein said second common dictionary format is different from said first common dictionary format;

swapping said first replicate and said second replicate such that said second replicate is a primary replicate and said first replicate is not a primary replicate;

after said swapping, sending, by said source replication server, additional replication data to said target replication server in said second common dictionary format, wherein a send queue in said source replication server comprises pending replication data in said first common dictionary format concurrently with said additional replication data in said second common dictionary format; and after said swapping, receiving, by said target replication server, said pending replication data from said source replication server in said first common dictionary format and said additional replication data from said source replication server in said second common dictionary format;

wherein said transforming and said applying treat said first replicate and said second replicate as equivalents.

12. The method of claim 11 wherein said first replicate is a mastered replicate, and said second replicate is a mastered replicate.

13. The method of claim 11 further comprising:
altering said first table to add a second column, wherein said first local dictionary format of said first table specifies a second column name for said second column of said first table and a second data type for said second column of said first table;

altering said second table to add a second column, wherein a second local dictionary format of said second table specifies said second column name for said second column of said second table and said second data type for said second column of said second table;

wherein said second common dictionary format specifies a second column transport name corresponding to said second column of said second table and a second column transport data type corresponding to said second column of said second table.

14. The method of claim 1 wherein said first replicate is a mastered replicate.

15. The method of claim 1 wherein said first common dictionary format comprises a plurality of column transport names corresponding to a plurality of columns, respectively, and wherein said first common dictionary format specifies a separate column transport data type for each column of said plurality of columns.

16. The method of claim 1 wherein said transforming comprises casting a value from said first column transport data type to said first data type.

17. The method of claim 1 wherein said target replication server comprises a first database server and a replication application, the method further comprising:
receiving an alter command to alter said first table by said first database server, wherein said first local dictionary format is to be altered;

in response to said alter command, issuing, by said first database server, an alter mode set operation to said replication application;

in response to said alter mode set operation, setting, by said replication application, said first table to alter mode, wherein said target replication server receives additional replication data from said second participant replication server, wherein said additional replication data comprises at least one data manipulation language operation, wherein said at least one data manipulation language operation is not applied to said first table while said first table is in said alter mode;

after said setting said first table to said alter mode,
changing said first local dictionary format to a second local dictionary format in accordance with said alter command; and altering said table in accordance with said alter command;

after said altering said first table, issuing, by said first database server, an alter mode unset operation;
in response to said alter mode unset operation, unsetting said alter mode on said first table; and
resuming application of said at least one data manipulation language operation in said additional replication data from said source replication server to said first table;
wherein said transforming transforms said additional replication data from said first common dictionary format to said second local dictionary format on said target replication server.

18. The method of claim 17 wherein said setting said first table to alter mode comprises setting a table-alter-mode flag in a header of said first table.

19. The method of claim 18 further comprising:
in response to said alter mode set operation, setting, by said replication application, a replicate-alter-mode flag for said first replicate;
exclusively locking, by said replication application, said first table;
wherein said table-alter-mode flag is set after said exclusively locking; and
unlocking, by said replication application, said first table.

20. The method of claim 19 further comprising:
in response to receiving, by said replication application, said alter mode unset operation, reactivating said first replicate, said reactivating comprising:
unsetting said table-alter-mode flag; and
unsetting said replicate-alter-mode flag.

21. The method of claim 1 further comprising:
in response to determining that said first local dictionary format and said common dictionary format do not match, setting a data-conversion flag; and
performing said transforming upon determining that said data-conversion flag is set.

22. The method of claim 1 wherein said received replication data comprises a row image in said first common dictionary format, and wherein said transforming transforms said row image to said first local dictionary format.

23. The method of claim 1 wherein said second table comprises a second local dictionary format specifying said first column name for said first column of said second table and a second data type for said first column of said second table, the method further comprising:
verifying that said first column transport name and said first column name of said second local dictionary format are identical and that said second data type is compatible with said first column transport data type.

24. A computer program product for replicating data, said computer program product comprising a computer readable storage medium having computer readable program code embodied therewith, said computer readable program code comprising:
computer readable program code configured to, in response to at least one command, create a first replicate specifying:
a) a target replication server and a source replication server, wherein said target replication server has a first table with a table name and said source replication server has a second table with said table name,
b) that changes to data in a first column of said second table are to be replicated,
c) a first common dictionary format comprising a first column transport name corresponding to said first column of said second table and a first column transport data type corresponding to said first column of said second table, and
d) a first local dictionary format specifying a first column name for a first column of said first table and a first data type for said first column of said first table, said first data type being different from said first column transport data type;
computer readable program code configured to verify, by said target replication server, that said first column transport name is identical to said first column name of said first local dictionary format, and that said first data type is compatible with said first column transport data type;
computer readable program code configured to, after said verify, receive, by said target replication server, replication data from said source replication server in said first common dictionary format, said replication data comprising at least one change to data in said first column of said second table;
computer readable program code configured to transform, by said target replication server, said replication data from said first common dictionary format to said first local dictionary format; and
computer readable program code configured to apply, by said target replication server, said transformed replication data to said first table.

25. The computer program product of claim 24,
wherein a second local dictionary format specifies said first column name for said first column of said second table and specifies a second data type for said first column of said second table, and
wherein said computer readable program code configured to verify further verifies, by said source replication server, that said first column transport name is identical to said first column name of said second local dictionary format, and that said second data type is compatible with said first column transport data type.

26. A system, comprising:
at least one processor and at least one memory; said at least one memory storing instructions, which when executed by said at least one processor, configures a target replication server to perform operations comprising:
in response to at least one command, creating a replicate specifying:
a) a target replication server and a source replication server, said target replication server having a first table with a table name and said source replication server having a second table with said table name;
b) that changes to data in a first column of said second table are to be replicated,
c) a first common dictionary format comprising a first column transport name corresponding to said first column of said second table and a first column transport data type corresponding to said first column of said second table, and
d) a first local dictionary format specifying a first column name for a first column of said first table and a first data type for said first column of said first table, said first data type being different from said first column transport data type;
verifying that said first column transport name is identical to said first column name of said first local directory format, and that said first data type is compatible with said first column transport data type;
after said verifying, receiving replication data from said source replication server in said first common dictionary format, said replication data comprising at least one change to data in said first column of said second table;

transforming said replication data from said first common dictionary format to said first local dictionary format; and applying said transformed replication data to said first table.

27. The system of claim 26, wherein a second local dictionary format specifies said first column name and a second data type for said first column of said second table, and wherein said operations further comprise verifying that said first column transport name is identical to said first column name of said second local dictionary format, and that said second data type is compatatible with said first column transport data type.

* * * * *